(12) United States Patent
Nagtilak et al.

(10) Patent No.: US 11,976,745 B2
(45) Date of Patent: May 7, 2024

(54) SCOTCH YOKE ACTUATOR

(71) Applicant: Emerson Process Management Regulator Technologies, Inc., McKinney, TX (US)

(72) Inventors: Balkrishna Digambar Nagtilak, Pune (IN); Yogesh Madhukar More, Pune (IN)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 17/776,755

(22) PCT Filed: Nov. 24, 2020

(86) PCT No.: PCT/US2020/062058
§ 371 (c)(1),
(2) Date: May 13, 2022

(87) PCT Pub. No.: WO2021/108433
PCT Pub. Date: Jun. 3, 2021

(65) Prior Publication Data
US 2022/0403949 A1 Dec. 22, 2022

(30) Foreign Application Priority Data
Nov. 25, 2019 (IN) .............................. 201921048156

(51) Int. Cl.
*F16K 31/163* (2006.01)
*F15B 15/06* (2006.01)

(52) U.S. Cl.
CPC .......... *F16K 31/163* (2013.01); *F15B 15/066* (2013.01)

(58) Field of Classification Search
CPC ............................... F16K 31/16; F16K 31/163
See application file for complete search history.

(56) References Cited

U.S. PATENT DOCUMENTS

| 3,146,681 | A | * | 9/1964 | Sheesley | ............... | F15B 15/066 |
| | | | | | | 92/138 |
| 3,261,266 | A | * | 7/1966 | Ledeen | ................. | F15B 15/066 |
| | | | | | | 92/138 |

(Continued)

OTHER PUBLICATIONS

QTRCO, Inc., F Series Product Bulletin, downloaded Oct. 19, 2020 from http://www.gtrco.com/f-series-flatyoke-valve-actuators.html, 48 pages.

(Continued)

*Primary Examiner* — Daphne M Barry
(74) *Attorney, Agent, or Firm* — Quarles & Brady LLP

(57) ABSTRACT

Embodiments of the invention provide an actuator (100) for a valve assembly. The actuator can include a yoke (146) with at least one bore (196), a first rod assembly (136), and a first slide member (148) seated within the at least one bore and pivotally connected to the first rod assembly. The yoke can be configured to rotate about a yoke axis (198) to actuate the valve assembly. The first rod assembly can be configured to move in a first direction transverse to the at least one bore and the yoke axis. The first slide member can be configured to slide telescopically within the at least one bore as the first rod assembly moves in the first direction to transmit torque to the yoke for actuation of the valve assembly.

20 Claims, 30 Drawing Sheets

(56) References Cited

U.S. PATENT DOCUMENTS

| | | | | |
|---|---|---|---|---|
| 3,704,986 A * | 12/1972 | Sheesley | ............. | F16K 31/1635 92/138 |
| 3,727,523 A * | 4/1973 | Gulick | ................ | F16K 31/1635 74/424.77 |
| 3,772,966 A * | 11/1973 | Mills | ........................ | F16H 21/44 92/66 |
| 3,929,024 A * | 12/1975 | Sheesley | ............... | F15B 15/066 74/509 |
| 4,261,546 A * | 4/1981 | Cory | ................... | F16K 31/1655 74/105 |
| 4,337,691 A * | 7/1982 | Tomaru | ................. | F15B 15/066 92/DIG. 1 |
| 4,355,566 A * | 10/1982 | Kaji | ...................... | F15B 15/066 92/138 |
| 4,463,662 A * | 8/1984 | Okuyama | ............. | F15B 15/066 92/75 |
| 4,697,468 A * | 10/1987 | Bergstrand | .............. | F16H 21/44 74/108 |
| 4,702,150 A * | 10/1987 | Kaji | ...................... | B60T 17/085 92/138 |
| 4,995,305 A * | 2/1991 | Garrigues | ............. | F15B 15/066 92/138 |
| 5,429,153 A * | 7/1995 | Squirrell | ................. | F15B 15/06 137/385 |
| 5,575,336 A * | 11/1996 | Morgan | ................. | F16K 5/0442 166/330 |
| 5,601,110 A * | 2/1997 | Rembert | ............. | F16K 31/1635 251/285 |
| 5,626,054 A * | 5/1997 | Rembert | ................ | F15B 15/066 403/114 |
| 8,087,316 B2 | 1/2012 | Holtgraver | | |
| 8,863,596 B2 | 10/2014 | Holtgraver | | |
| 10,655,712 B2 * | 5/2020 | Marinoni | .............. | F16K 31/528 |
| 11,028,923 B2 * | 6/2021 | Kamp | ...................... | F16J 1/001 |
| 2008/0202263 A1 * | 8/2008 | Holtgraver | .......... | F16K 31/1635 74/50 |
| 2009/0025548 A1 * | 1/2009 | Sato | .................... | F16K 31/1635 92/132 |
| 2010/0199805 A1 * | 8/2010 | Downs | .................... | F16H 29/08 74/837 |
| 2017/0030382 A1 * | 2/2017 | Sujanani | ................. | F16K 1/523 |
| 2017/0122416 A1 * | 5/2017 | Hobert | ..................... | F15B 15/06 |
| 2017/0314584 A1 * | 11/2017 | Holtgraver | ............ | F15B 11/123 |
| 2018/0135665 A1 * | 5/2018 | Holtgraver | .......... | F15B 15/1409 |
| 2022/0146016 A1 * | 5/2022 | Paradiso | .................. | F17D 5/00 |

OTHER PUBLICATIONS

QTRCO, Inc., Traditional Scotch Yoke Design Compromises, downloaded Oct. 19, 2020, www.qtrco.com/scotch-yoke-mechanism.html, 6 pages.

* cited by examiner

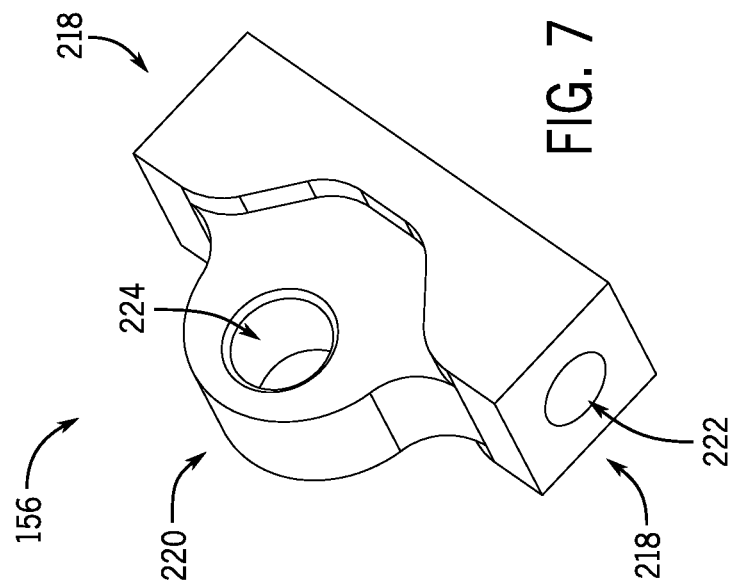
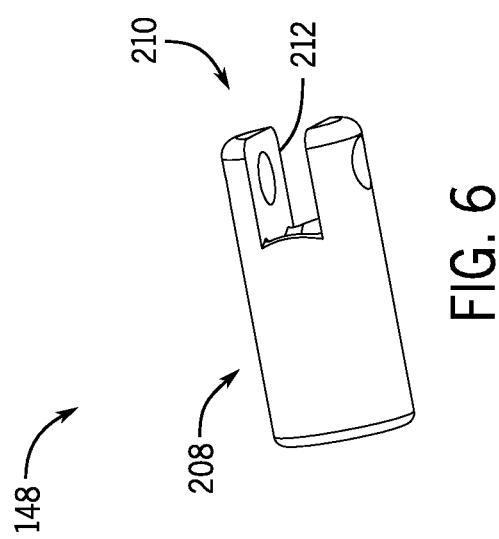

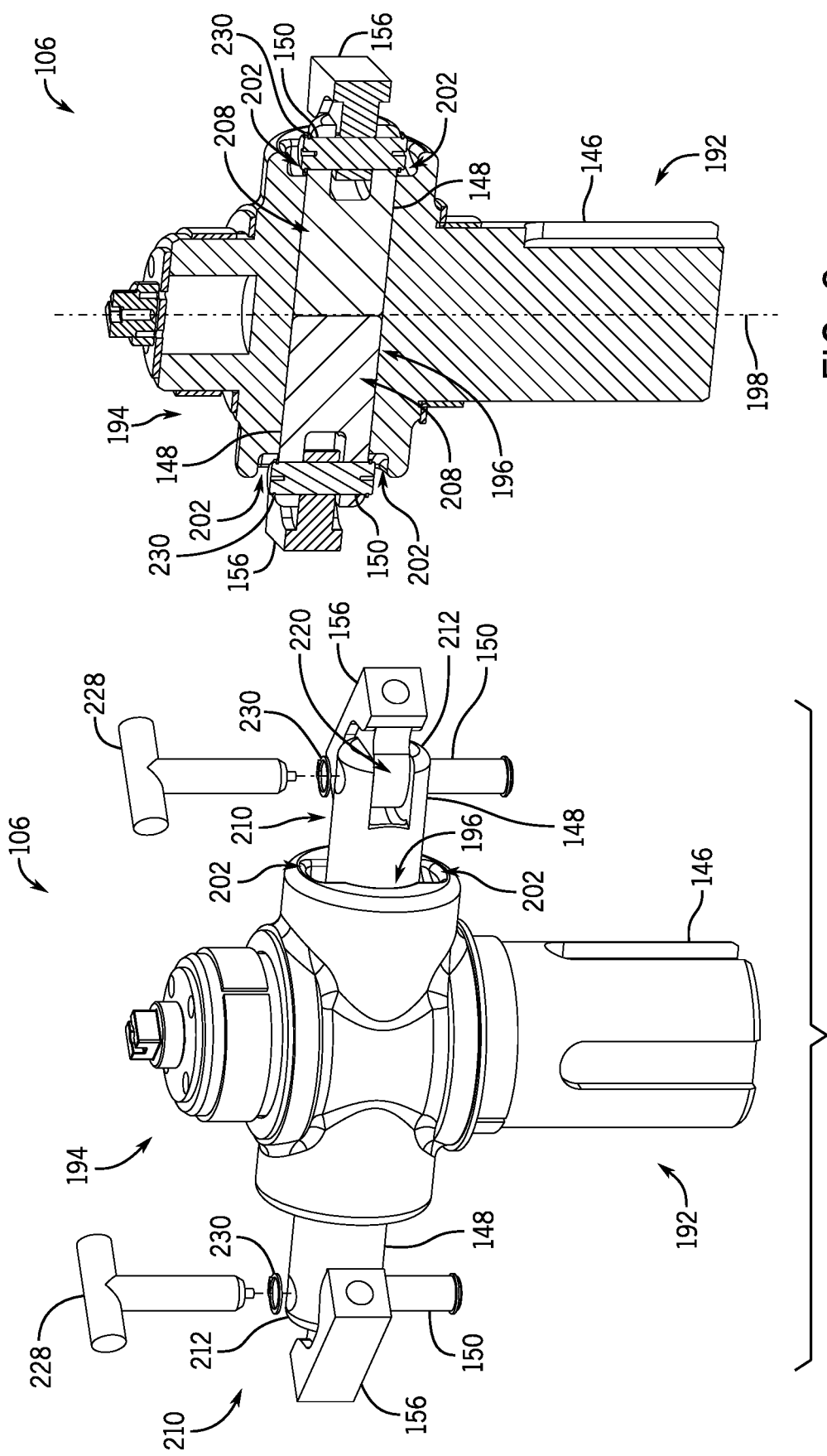

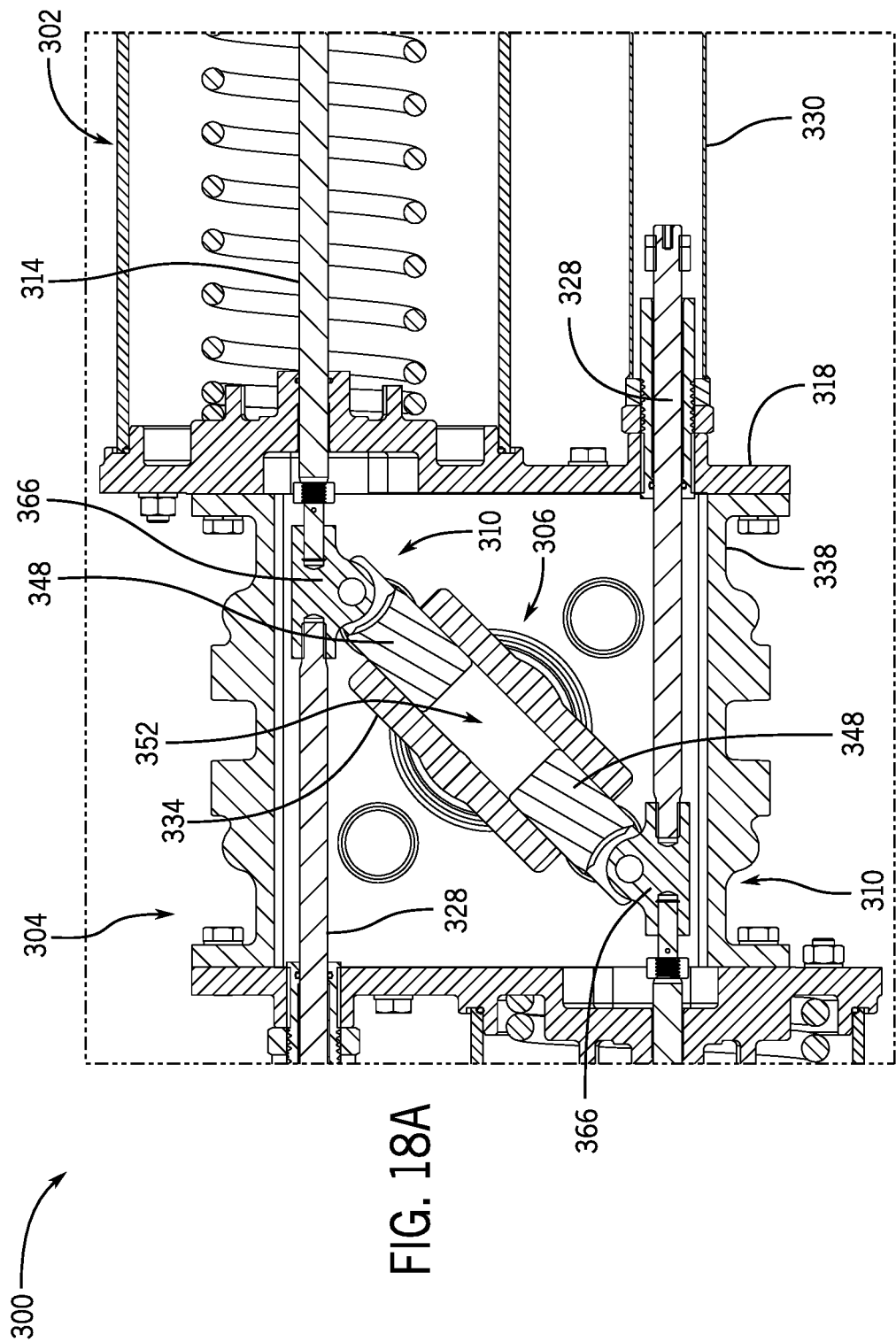

SCOTCH YOKE ACTUATOR

This application is a U.S. National Stage application, filed pursuant to 35 U.S.C. § 371, of international application no. PCT/US2020/062058, filed on Nov. 24, 2020, the contents of which is incorporated herein by reference in its entirety.

BACKGROUND

Rotary to linear motion, and vice versa, can be useful when reciprocating rotary actuation is required. In some contexts, Scotch yoke actuators can be used to convert linear motion to rotary motion, including to open and close valves. A Scotch yoke actuator can include a housing and a rod assembly that moves back and forth transverse to a rotatable shaft of a yoke that is offset from the rod assembly. The rod assembly can be part of a piston assembly so that linear motion of a piston of the piston assembly can cause, via the rod assembly, a corresponding rotational motion of the yoke. The housing is typically dimensioned to enclose the yoke when the yoke is at any of the working rotational orientations.

SUMMARY OF THE INVENTION

Some embodiments of the invention provide an actuator for a valve assembly. The actuator can include a yoke, a first rod assembly, and a first slide member. The yoke can include at least one bore and can be configured to rotate about a yoke axis to actuate the valve assembly. The at least one bore can extend transverse to the yoke axis. The first rod assembly can be configured to move in a first direction transverse to the at least one bore and the yoke axis. The first slide member can be seated within the at least one bore and pivotally secured to the first rod assembly. The first slide member can be configured to slide telescopically within the at least one bore as the first rod assembly moves in the first direction to transmit torque to the yoke for actuation of the valve assembly.

Some embodiments provide an actuator with a first slide member that includes a first free end that is pivotally secured to a first rod assembly and a second free end that is telescopically nested with at least one bore formed in a yoke. The first free end of the first slide member can be pivotally secured to the first rod assembly via a pivoting connection to a connecting arm that is in threaded engagement with the first rod assembly.

Some embodiments provide an actuator that includes a first rod assembly. The first rod assembly can include a piston rod of a cylinder assembly that is configured to controllably move the first rod assembly in a first direction.

Some embodiments provide an actuator that includes a piston rod that is slidably supported with a sliding bushing. The piston rod can be a stepped rod with a shoulder that contacts the sliding bushing after a predetermined movement in a first direction to slide the sliding bushing in the first direction.

Some embodiments provide an actuator that includes a housing that at least partially encloses a yoke, a first rod assembly, and a first slide member. The first rod assembly can extend across the housing transverse to a yoke axis and can be slidably supported on opposing sides of the housing for movement in a first direction.

Some embodiments provide an actuator that includes a housing. The housing can include a housing shell that is open on opposing sides, a first end cap, and a second end cap. The first and second end caps can slidably support a first rod assembly.

Some embodiments provide an actuator that includes a first end cap that can support a linear actuator relative to a housing. The linear actuator can move a first rod assembly in a first direction. The end cap can be configured to be secured to the housing in either of two orientations to provide either of two opposite rotational modes for the yoke.

Some embodiments provide an actuator that includes a rod assembly. The rod assembly can include a piston rod that extends through a first side of opposing sides of a housing. The rod assembly can include a connecting arm that is threadedly secured to the piston rod and pinned to a first slide member. The rod assembly can include a guide rod that is threadedly secured to the connecting arm opposite the piston rod and can extend through a second side of the opposing sides of the housing. The piston rod can be slidably supported by a first end cap and the guide rod can be slidably supported by a second end cap.

Some embodiments provide an actuator that includes a limit stop bushing in threaded engagement with a housing of the actuator (e.g., with an end cap of the housing). A rod assembly can extend through the limit stop bushing. The limit stop bushing can be threadedly adjustable relative to the housing to adjust a limit stop location for the rod assembly relative to movement of the rod assembly in a first direction.

Some embodiments provide an actuator that includes a limit stop bushing. The limit stop bushing can include a first side configured to contact a first part of a rod assembly to provide a first limit stop. A second side of the limit stop bushing can be configured to contact a second part of the rod assembly to provide a second limit stop.

Some embodiments provide an actuator that includes a first rod assembly and a second rod assembly. The second rod assembly can be configured to move in a second direction transverse to at least one bore formed in a yoke and transverse to a yoke axis. The actuator can include a first and a second slide member. The second slide member can be seated within the at least one bore and pivotally secured to the second rod assembly. The second slide member can be configured to slide telescopically within the bore as the second rod assembly moves in the second direction, to transmit torque to the yoke to actuate a valve assembly. The bore can include a first bore that receives the first slide member at a first end thereof and receives the second slide member at a second end thereof.

Some embodiments provide an actuator that includes a yoke having a bore that includes a slot. A pin can extend from a first slide member to slidably engage the slot. The slot can be a closed-end slot.

Some embodiments of the invention provide a yoke for an actuator of a valve assembly. The yoke can include a valve-engagement portion and a rod-securing portion. The valve-engagement portion can be configured to engage a valve member for rotation of the valve member by the actuator. The rod-securing portion can be separately formed from the valve-engagement portion. The rod-securing portion can be secured to the valve-engagement portion to define a passage between the rod-securing and valve-engagement portions on first and second opposing sides of the passage. The passage can be sized to receive, via at least one of a third or a fourth opposing side of the passage, one or more slide members that are pivotally secured to one or more rod assemblies of the actuator so that sliding movement of the one or more rod assemblies is converted to torque on the yoke via sliding movement of the one or more slide members within the passage, along the bearing members. The passage can be sized to receive two of the slide members for opposed, parallel, overlapping movement.

Some embodiments of the invention provide a method for reversing a rotational mode of a Scotch yoke actuator for a valve. The method can include disconnecting a connecting arm from a first slide member, the connecting arm being disposed within a housing of the actuator and, before being disconnected, pivotally supporting the first slide member for telescopic movement within a corresponding bore of a yoke of the actuator. The method can include removing, from proximate a first entry into the housing on a first side of the housing, the connecting arm and a linear actuator for applying torque to the yoke via an actuator rod and the connecting arm. The method can include, without reversing an orientation of the housing, inserting the connecting arm into a second entry into the housing on the first side of the housing, and securing the linear actuator to the housing proximate the second entry. The method can include connecting the connecting arm to a second slide member within the housing for telescopic movement of the second slide member within the yoke. The method can further include, before removing the actuator from proximate the first entry, unscrewing a first guide rod from engagement with the connecting arm, and, after inserting the connecting arm into the second entry, screwing the first or a second guide rod into engagement with the connecting arm.

Some embodiments of the invention provide a method of removing a yoke of a Scotch yoke actuator for a valve. The method can include unscrewing an actuator rod of a linear actuator from engagement with a connecting arm that is disposed within a housing of the actuator and that pivotally supports a slide member for telescopic movement within a corresponding bore of the yoke. The method can include removing a top cover of the housing to provide a top opening in the housing, without detaching the linear actuator from the housing or removing a side wall of the housing that supports the actuator and the actuator rod during operation. The method can include removing the yoke through the top opening.

Some embodiments of the invention provide an actuator for a valve assembly. The actuator can include a yoke, a rod assembly, and a slide member. The yoke can include a passage. The yoke can be configured to rotate about a yoke axis to actuate the valve assembly, and the passage can extend from a perimeter edge of the yoke toward the yoke axis. The rod assembly can be configured to move in a first direction that is transverse to the passage and the yoke axis. The slide member can be pivotally secured to the rod assembly at a first end and extend from the first end toward the yoke axis, to a second end of the slide member that is opposite the first end and is in sliding engagement with the passage. Movement of the rod assembly in the first direction can cause the slide member to pivot relative to the rod assembly at the first end and slide within the passage at the second end and thereby provide torque on the yoke.

Some embodiments of the invention provide an actuator for a valve assembly. The actuator can include a yoke, a rod assembly, and a slide member. The yoke can be configured to rotate about a yoke axis to actuate the valve assembly. The rod assembly can be configured to move in a first direction transverse to the yoke axis. The slide member can be pivotally secured to the rod assembly at a first end and extend from the first end toward the yoke axis, to a second end of the slide member that is telescopically engaged with the yoke. The slide member can thereby be configured to exhibit a changing angle relative to the rod assembly and a corresponding changing telescopic depth of engagement with the yoke as the rod assembly moves in the first direction, to provide torque on the yoke.

BRIEF DESCRIPTION OF DRAWINGS

FIG. 6 is an isometric view of a slide member of the actuator of FIG. 1.

FIG. 7 is an isometric view of a connecting arm of the rod assembly of FIG. 3.

FIG. 8 is an isometric view of the yoke assembly of FIG. 3 and a securing tool according to an embodiment of the invention.

FIG. 9 is a cross-sectional isometric view of connecting arms secured to the yoke assembly of FIG. 8.

FIG. 18A is a top cross-sectional partial view of the actuator of FIG. 14 in a 0 degree rotational orientation.

DETAILED DESCRIPTION OF THE INVENTION

Figure 1:
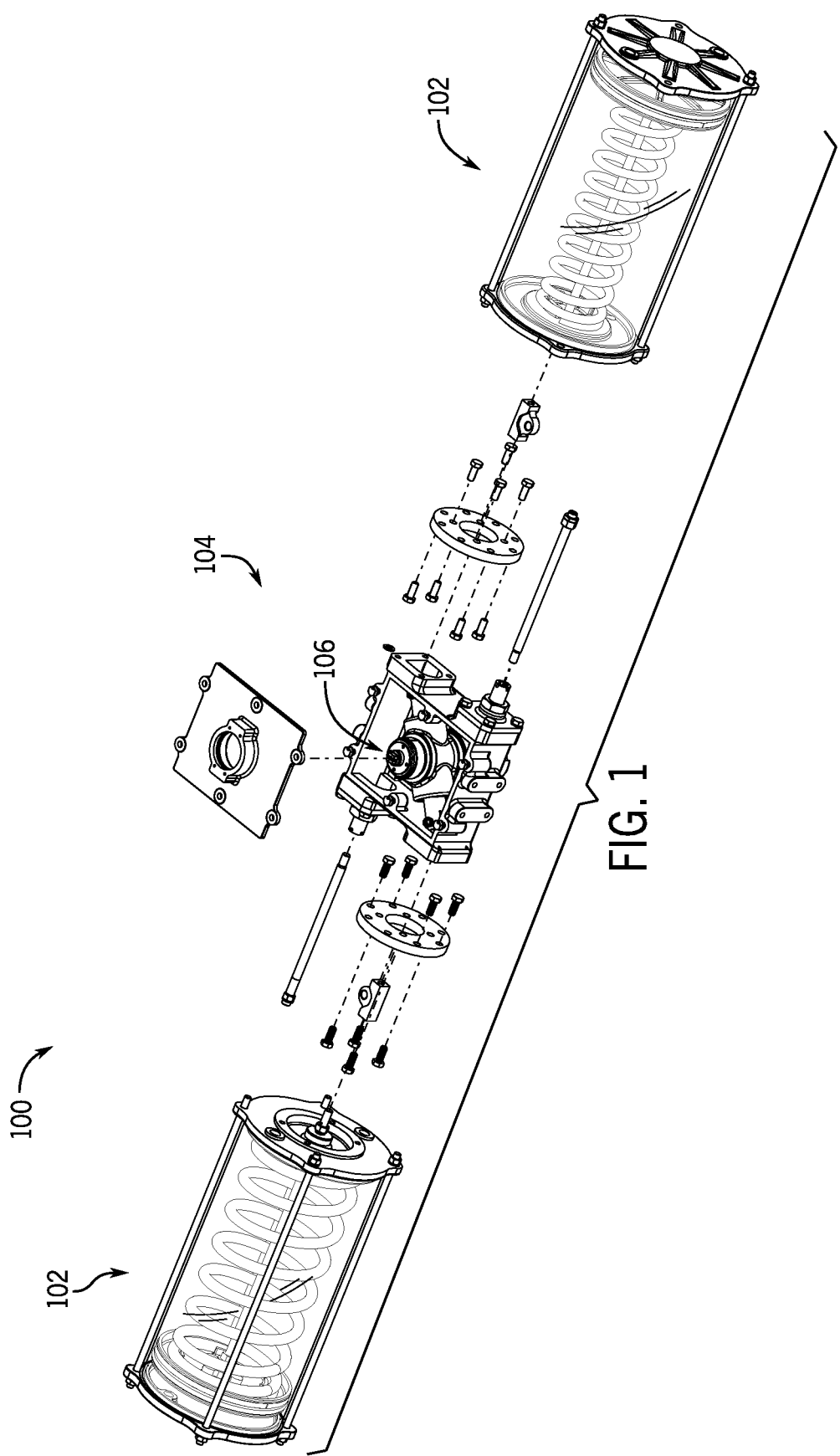
FIG. 1 is an exploded isometric view of an actuator for a valve assembly according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Generally, unless otherwise specified or limited, directional terms are used herein with respect to example orientations or particular illustrations only and are not intended to indicate absolute orientations. For example, some components may be described as "upper" or "lower" components, which may indicate the position of those components relative to others for a given (e.g., illustrated) configuration, but which may not necessarily limit those components to an absolute position. Similarly, unless otherwise specified or limited, angular references are made with respect to example orientations or particular illustrations only and are not intended to indicate absolute orientations.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention generally relate to an actuator for a valve assembly, including as described in further detail below. As briefly described above, an actuator, and in particular, a Scotch yoke actuator, can be used to convert linear motion to rotary motion. Although other configurations are possible, a Scotch yoke actuator typically provides a rotational range of approximately 90 degrees, with a torque that is high at the ends of yoke travel (e.g., at or near 0 and 90 degrees rotational orientation about a yoke axis) and is lower in the middle of yoke travel (e.g., at 45 degrees rotational orientation about a yoke axis). These torque-curve characteristics can be particularly beneficial for some operations, including actuation of some valves.

Scotch yoke actuators generally include a housing having a rod assembly that moves back and forth linearly with respect to a yoke that defines a rotational axis. The actuator can also include a linear actuator, such as a spring cylinder assembly (i.e., a piston), for example. One end of the rod assembly can be coupled to the spring cylinder and the other end of the rod assembly can be coupled to the yoke. Accordingly, force imparted by the linear actuator onto the rod assembly can be transmitted to the yoke, to be converted to torque (e.g., to open or close a valve).

In some Scotch yoke actuators, a spring of a spring cylinder can compress due to pneumatic pressure acting against a piston of the cylinder, thereby simultaneously rotating the yoke in a first direction. During a return stroke, as the pneumatic pressure is released, the compressed spring can expand, thereby moving the piston outward from the yoke and simultaneously rotating the yoke in a second direction. Thus, for example, such actuators may have a default (e.g., "fail") orientation, as defined by a resting (e.g., uncompressed) position of the spring.

In some Scotch yoke actuators, a housing that surrounds the yoke includes extended portions on one or more sides of the housing to accommodate the space required by a yoke, a push rod assembly, and a connection mechanism therebetween during rotation of the yoke. Accordingly, some housings for Scotch yoke actuators can require substantial installation space and, correspondingly, can include substantial material with substantial overall weight.

In some instances, extended portions of a housing and a spring cylinder assembly can also result in an increase in a cantilever load on the housing or on a rod assembly. With regard to the latter, for example, this configuration can thus lead to lower operational efficiency and reduced operational lifetimes.

Further, some Scotch yoke actuators require substantially complex or otherwise time-consuming operations for maintenance or reconfiguration. For example, in conventional designs, disassembly of an actuator (e.g., the spring cylinder assembly) from a housing may be required to replace internal components of the actuator, such as a yoke seal or bushing, for example. Disassembling the spring cylinder assembly from the housing before disassembling the entire housing can be a time-consuming process. Additionally, in order to switch between clockwise and counter clockwise fail directions for conventional Scotch yoke actuators, the orientation of the entire actuator assembly and the actuator housing may need to be reversed. This can also be time-consuming.

Thus, in general, it can be useful to reduce the size of Scotch yoke actuators to accommodate limited installation space, reduce system weight, and reduce costs related to manufacturing. It may also be useful to improve (e.g., reduce) stress concentrations in the actuator, including in the yoke, the rod assembly, and the housing. It may also be useful to provide streamlined methods for assembly, maintenance, and reversing of a rotational mode (e.g., fail direction) of a Scotch yoke actuator. Embodiments of the invention can provide one or more of these benefits, or various others, while retaining other beneficial aspects of Scotch yoke designs in general (e.g., the torque characteristics noted above).

In some embodiments, improvements in size, stress distributions, and assembly/maintenance can be achieved through the use of a telescoping assembly. For example, a yoke of a Scotch yoke actuator can include a passage (e.g., a cylindrical bore) that extends transversely relative to a rotational axis of the yoke. A rod assembly can pivotably support a slide member that extends transversely relative to an axis of the rod assembly (and relative to the yoke axis) and is sized to be received and to slide within the passage of the yoke. As the rod assembly is moved relative to the yoke, e.g., via linear movement as driven by a linear actuator, the slide member can pivot relative to the rod assembly to thereby apply torque to the yoke while simultaneously sliding within the yoke passage. Thus, for example, linear movement of the rod assembly can be converted to torque at the yoke, but with a reduced overall footprint and with improved stress distribution (e.g., with reduced transverse loading on the rod assembly) as compared to conventional arrangements. Further, in some embodiments, a telescoping arrangement can allow for easier installation and maintenance operations, including for operations to change (e.g., reverse) a rotational mode of the actuator.

FIG. 1 illustrates an exploded view of an actuator 100 for a valve assembly according to one embodiment of the invention. The actuator 100 includes, among other components, a cylinder assembly 102, a housing assembly 104, and a yoke assembly 106. In the illustrated embodiment, the actuator 100 includes first and second cylinder assemblies 102 that are substantially identical (i.e., identical to within acceptable tolerances for a common manufacturing process) and can be installed on opposing sides of the housing assembly 104. Thus, the discussion below for a single one of the cylinder assembles 102 generally applies equally to both of the cylinder assemblies 102. In some embodiments, however, only a single cylinder assembly may be provided, or multiple cylinder assemblies may not be substantially identical to each other. Moreover, some embodiments may include one or more other types of actuators (e.g., other linear actuators) in addition to or instead of one or more cylinder assemblies.

Figure 2:
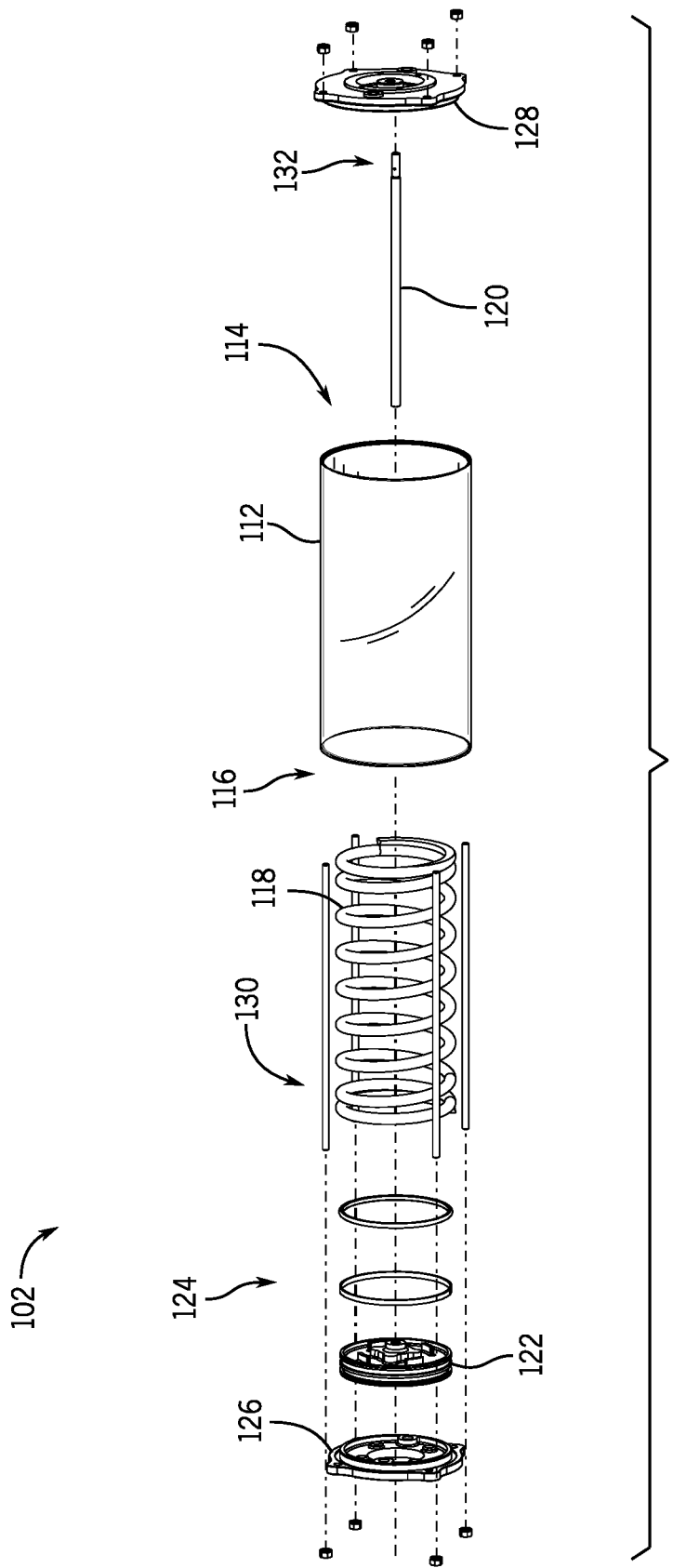
FIG. 2 is an exploded side view of a cylinder assembly of the actuator of FIG. 1.

FIG. 2 illustrates an exploded view of the cylinder assembly 102 of the actuator 100 (see FIG. 1). The cylinder assembly 102 includes a cylinder body 112 that generally defines a medial end 114 and a lateral end 116 with respect to the housing assembly 104 (i.e., the medial end 114 is secured proximate to the housing assembly 104). The cylinder body 112 is dimensioned to receive a spring 118, a piston rod 120 having a threaded end 132, and a piston head 122. The cylinder assembly 102 further includes seal components 124 configured as rings that are seated between an outer piston end cap 126 and the cylinder body 112 at the lateral end 116. The outer piston end cap 126 and an inner piston end cap 128 are each configured to receive a plurality of fasteners 130 to secure the cylinder body 112 between the outer piston end cap 126 and the inner piston end cap 128. In the illustrated embodiments, the fasteners 130 are configured as a plurality of tie rods having opposing threaded ends, although other configurations are possible. The threaded ends are dimensioned to receive nuts to secure each of the outer piston end cap 126 and the inner piston end cap 128 relative to each of the plurality of rods of the fasteners 130.

Figure 3:
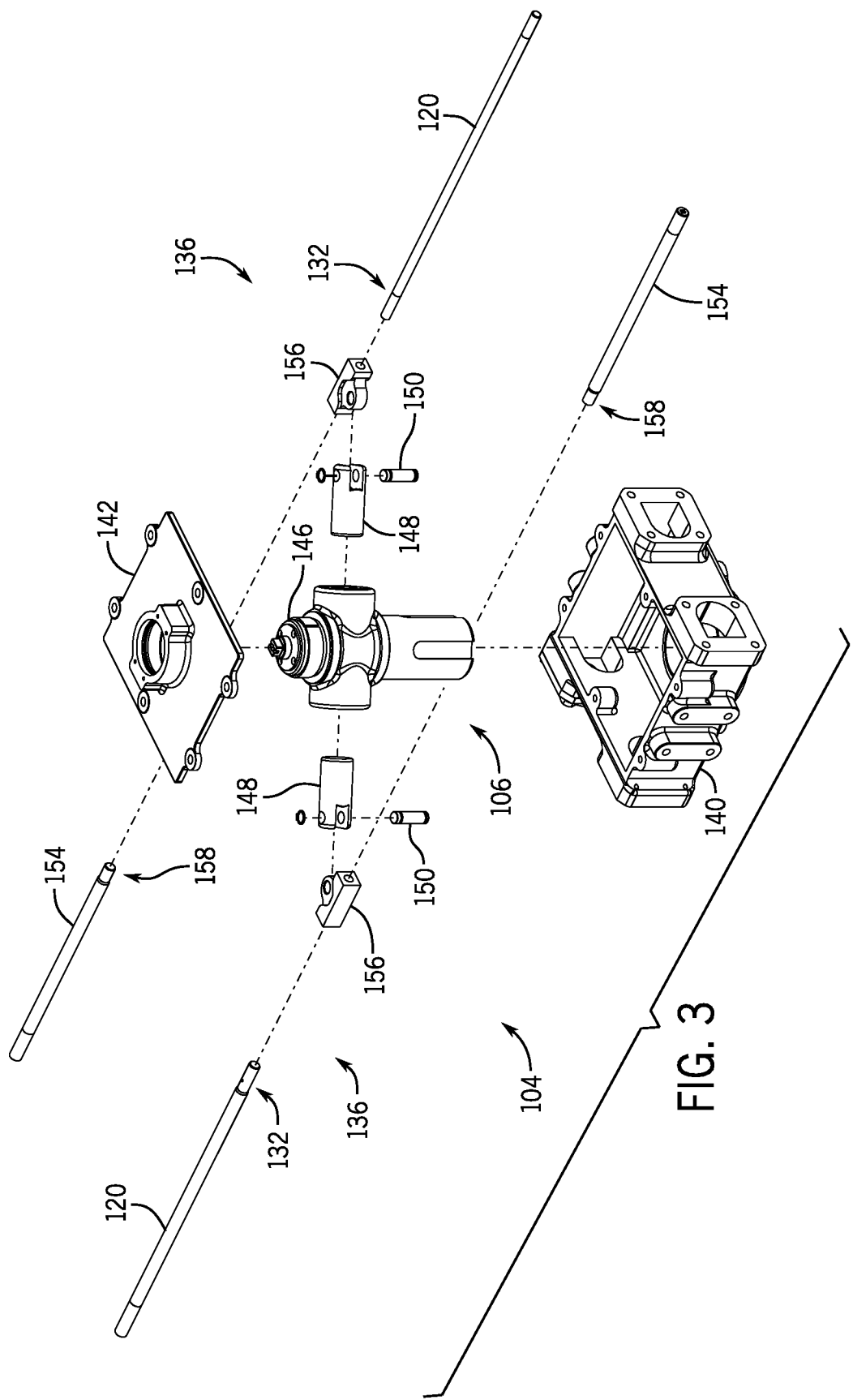
FIG. 3 is an exploded isometric view of a housing assembly, a yoke assembly, and a rod assembly of the actuator of FIG. 1.

FIG. 3 illustrates the housing assembly 104 and the yoke assembly 106 of the actuator 100, as well as a rod assembly 136. In the illustrated embodiment, the actuator 100 includes first and second rod assemblies 136 that are substantially identical (i.e., identical to within acceptable tolerances for a common manufacturing process) and are installed on opposing sides of the housing assembly 104 in communication with a corresponding one of the two cylinder assemblies 102. Thus, the discussion below for a single one of the rod assemblies 136 generally applies equally to both of the rod assemblies 136. In some embodiments, however, only a single rod assembly may be provided, such as in the case of a single-cylinder assembly. In other embodiments, rod assemblies may not be substantially identical to each other.

Still referring to FIG. 3, the housing assembly 104 includes a base 140 (e.g., a cast metal base) and a cover 142. The yoke assembly 106 includes a yoke 146, a slide member 148, and a slider pin 150. In particular, in the illustrated embodiment, the yoke assembly 106 includes a pair of the slide members 148 and the slide pins 150. However, in some embodiments, such as in the case of a single-cylinder assembly, the yoke assembly 106 may include a single slide member and a corresponding single slider pin (or other similar components). Further illustrated in FIG. 3, the rod assembly 136 includes the piston rod 120, a guide rod 154, and a connecting arm 156. Similar to the piston rod 120, the guide rod 154 includes a threaded end 158. Correspondingly, as also discussed below, the connecting arm includes opposing threaded bores that can threadedly engage the threaded ends 132, 158 of the piston and guide rods 120, 154 to secure the rod assembly 136 together for unified movement.

Figure 4:
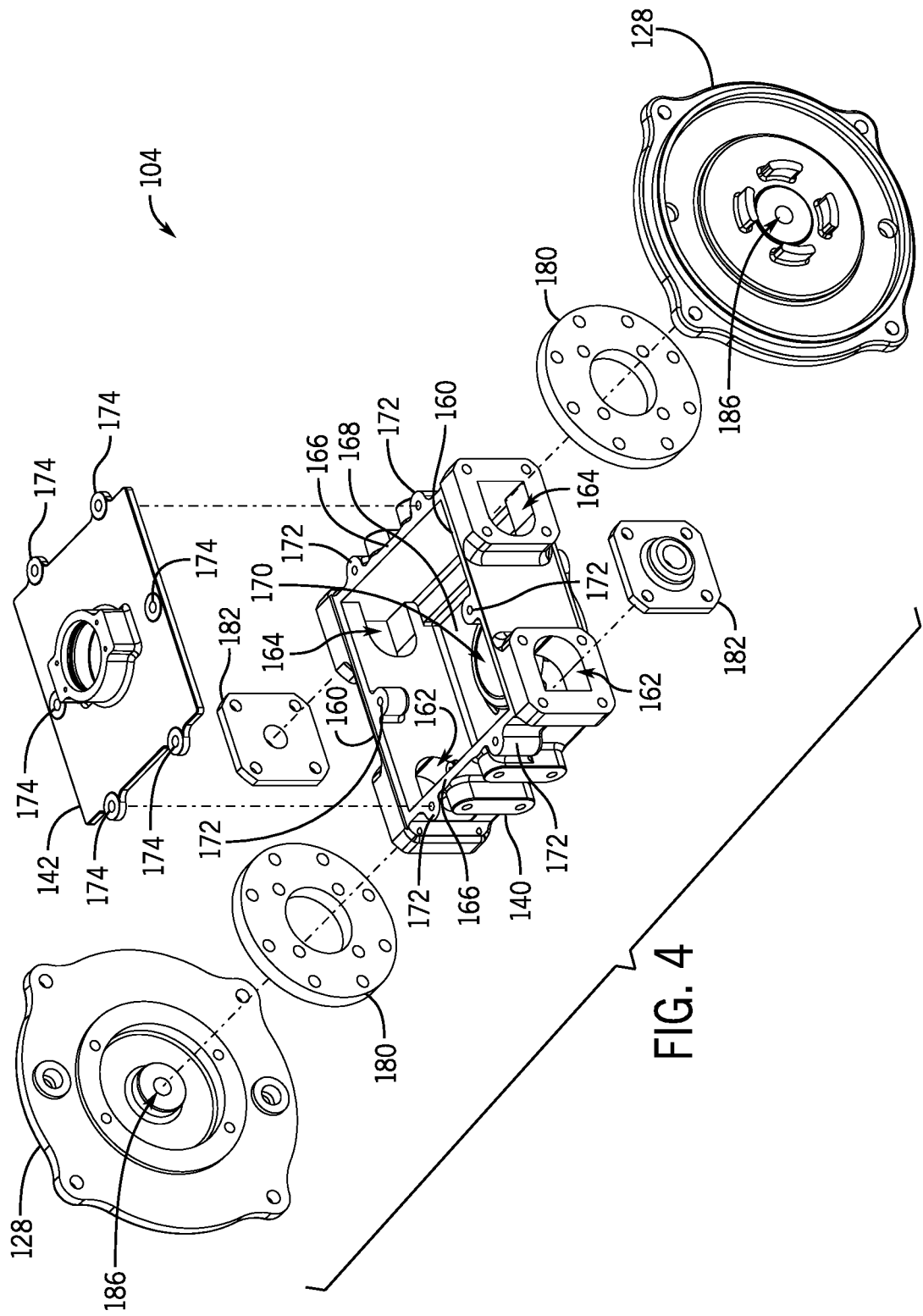
FIG. 4 is an exploded isometric view of the housing assembly of FIG. 3.

FIG. 4 illustrates the housing assembly 104 of the actuator 100. The base 140 of the housing assembly 104 is configured as a housing shell with opposing sets of side walls, including a first set of opposing side walls 160. The side walls 160 are substantially identical, with each of the first opposing side walls 160 including a first passage 162 and a second passage 164. Each of the first passage 162 and the second passage 164 define central axes that are substantially parallel. Additionally, each axis for the respective first passages 162 are aligned, and each axis for the respective second passages 164 are aligned. Each of the first and second passages 162, 164 extend through a respective boss, each of the respective bosses extending outwardly from the base 140 to provide a protruding feature on the respective side wall 160. In some embodiments, more or fewer passages are possible. For example, opposing side walls of a housing shell may each include a single passage. Similarly, other shapes or locations of openings to provide passages into a housing can be used on other embodiments.

The base 140 of the housing assembly 104 further includes a second set of opposing side walls 166 that are generally perpendicular to the first set of opposing side walls 160. The base 140 also includes a bottom surface 168 that is generally orthogonal to each of the pairs of opposing side walls 160, 166. The bottom surface 168 includes a yoke aperture 170 that is sized to receive one end of the yoke 146 (see, e.g., FIG. 3). In the illustrated embodiment, each of the opposing side walls 160, 166 of the base 140 include one or more first mounting features 172. The cover 142 of the housing assembly 104 similarly includes a plurality of second mounting features 174. The first mounting features 172 generally correspond to the second mounting features 174 so that one or more fasteners can extend therethrough to secure the cover 142 to the base 140 of the housing assembly 104.

Still referring to FIG. 4, the housing assembly 104 is configured to receive a set of end caps 180, 182. The end caps 180 are formed as cylindrical plates that are configured to be secured to the bosses of the housing assembly 104 in alignment with the passages 164 and also to the cylinder assemblies 102 in alignment with the rod assembly 136, to support cylinder assemblies 102 relative to the housing assembly 104 and to thereby slidably support the rod assembly 136 relative to the housing assembly 104. The end caps 182 are formed as rectangular plates that are configured to be secured to the bosses of the housing assembly 104 in alignment with the passages 162, to also slidably support the rod assembly 136 relative to the housing assembly 104. As further discussed below, the end caps 180, 182 can be interchanged between the illustrated positions to change a rotational mode of the actuator 100 (e.g., with both of the end caps 180 secured in alignment with the passages 162 and both of the end caps 182 secured in alignment with the passages 164). Additionally, although the illustrated geometries of the end caps 180, 182 may be useful relative to structural stability and ease of manufacture, other embodiments can be shaped or sized differently.

As also shown in FIG. 4, the inner piston end cap 128 includes a through hole 186 that defines an end cap axis. Further, the through hole 186 is sized to provide transverse support to the rod assembly 136 during operation. Similarly, each of the end caps 182 includes a through hole (e.g., through a circular boss, as shown) that also defines an end cap axis and that can slidably receive and provide transverse support for the rod assembly 136 opposite the end caps 128, 180. The mounting features of the end caps 180 are configured to secure the end caps 180 and inner piston end caps 128 relative to either one of the first or second passages 162, 164. The mounting features of the end caps 182 are configured to secure the end caps 182 relative to the other of the first or second passages 162, 164. For each set of passages 162 or 164, the end cap axes of the end caps 128, 180, 182, when in a secured position, are configured to be aligned with the respective central axis of the corresponding passage 162, 164 and with each other.

In the illustrated embodiment, for example, one set of the end caps 180, 182 is aligned with the first passages 162 of the opposing side walls 160, and the other set of the end caps 180, 182 is aligned with the second passage 164 of the opposing side walls 160, with the end caps 180 (and the inner piston end caps 128) on opposing sides of the housing assembly 104 from each other. As also noted above, however, in other embodiments or installations, each of the end caps 180, 182 (and 128) can be aligned with the other of the respective first and second passages 162, 164. Further, in some embodiments, other features (e.g., features on the end caps 180) can provide transverse support as the rod assembly 136 slides through the corresponding passage 162, 164.

Figure 5:
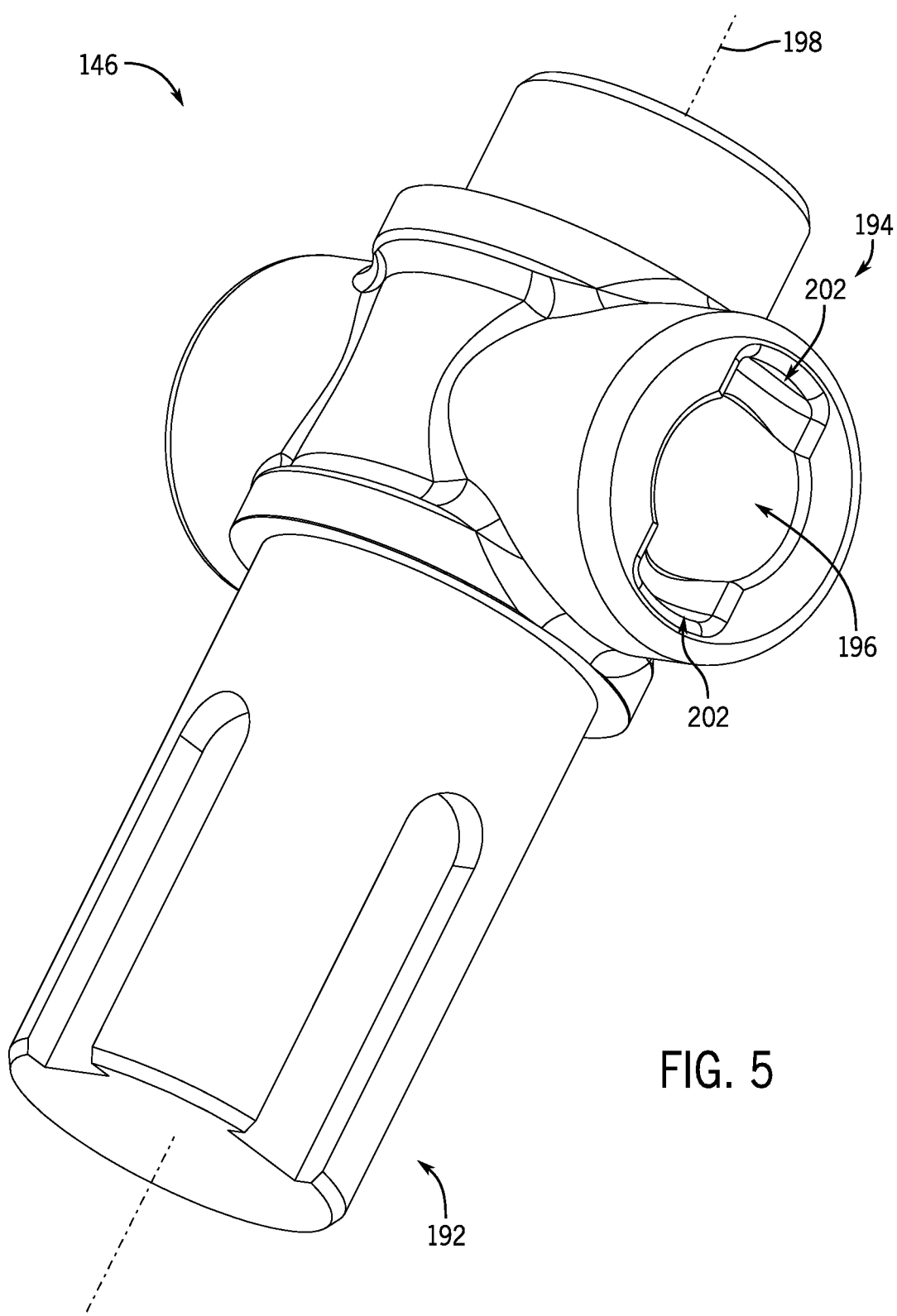
FIG. 5 is an isometric view of a yoke of the yoke assembly of FIG. 3

FIG. 5 illustrates the yoke 146 of the yoke assembly 106. The yoke 146 includes a valve engagement portion 192 and a rod-securing portion 194 that defines a bore 196. In the illustrated embodiment, the bore 196 extends fully through the rod-securing portion 194 along a single axis (see, for example, FIG. 9). However, in some embodiments, a yoke can include a rod-securing portion that defines a first bore and a second bore that are separated. For example, first and second bores may extend along a common axis or different axes only partly through a yoke, in opposite directions, or may extend fully through a yoke along different axes. Additionally, in some embodiments, a bore can include one or more of a variety of bore geometries. For example, a cross section of a bore can have a regular geometry, such as circular, rectangular, triangular, etc., or an irregular geometry and different bores can have the same or varying cross-sections along their respective lengths. The yoke 146 defines a yoke axis 198 around which the yoke 146 is configured to rotate to actuate the valve assembly, and the bore 196 extends transverse to the yoke axis 198 (e.g., perpendicularly to the yoke axis 198, as shown).

In some embodiments, a yoke that defines a bore can include notches or slots proximate to outer ends of the bore that extend toward a yoke axis. For example, the bore 196 includes notches 202 formed on outer ends of the bore 196. The notches 202 generally provide clearance for the slider pin 150 and the rod assembly 136 generally (see, for example, FIG. 9) as the yoke 146 rotates about the yoke axis 198 when the actuator 100 is assembled. In some instances, the notches 202 can facilitate alleviating stress concentrations in the yoke 146, particularly at the rod-securing portion 194. In this regard, for example, it may be useful for an outer wall of the bore 196 to fully encompass the notches 202 (as shown), so that the notches 202 do not interrupt an outer annular profile of the yoke 146 around the bore 196. In some embodiments, however, such an outer annular profile may be interrupted, or a bore or other passage in a yoke may not include notches or slots.

FIG. 6 illustrates the slide member 148 of the yoke assembly 106. The slide member 148 includes a first free end configured as a slide portion 208 and a second free end configured as a securing portion 210. The slide portion 208 is generally configured as a cylindrical body that is dimensioned to be received by the bore 196 of the yoke 146. In particular, the securing portion 210 includes a clevis structure 212 that is configured to secure the connecting arm 156 to the slide member 148 via the slider pin 150. In other embodiments, however, other configurations are possible. For example, a connecting arm may include a similar clevis structure that receives an extension of a slide member.

FIG. 7 illustrates the connecting arm 156 of the rod assembly 136. The connecting arm 156 includes opposing ends 218 and a pivot portion 220 positioned between the opposing ends 218. Each of the opposing ends 218 include a threaded hole 222 that extends at least partially from the respective opposing end 218 toward the pivot portion 220. The pivot portion 220 includes a pivot bore 224 that extends transversely to the threaded holes 222 and that is dimensioned to receive the slider pin 150 to secure the slide member 148 to the connecting arm 156. In other embodiments, other configurations are possible, including different known structures to secure a slide member or rods of a rod assembly to corresponding portions of a connecting arm.

FIG. 8 illustrates an example arrangement of the connecting arms 156 and the yoke assembly 106 in a preinstalled configuration and a corresponding example method of assembly. As briefly described above, each connecting arm 156 can be secured to the yoke assembly 106 via the securing portion 210 of the slide member 148. In particular, the pivot portion 220 of the connecting arm 156 can be inserted into the clevis structure 212 of the slide member 148. The slider pin 150 may be partially inserted into one side of the clevis structure 212 (e.g., may be thus staged for later insertion, prior to insertion of the pivot portion 220 of the connecting arm 156 into the clevis structure 212). Once the pivot bore 224 is aligned within the clevis structure 212, a tool, such as a pin installation tool 228, can be inserted into the other side of the clevis structure 212 and through the pivot bore 224 to engage (e.g., via threads) the slider pin 150. Once the pin installation tool 228 is secured to the slider pin 150, the pin installation tool 228 can be used to move the slider pin 150 through the clevis structure 212, and thereby the pivot bore 224, to pivotably couple the connecting arm 156 to the yoke assembly 106. Once the slider pin 150 is extended through the clevis structure 212 and the pivot bore 224, the pin installation tool 228 can be removed from the slider pin 150 and a retainer 230 (e.g., an E- or C-clip) can engage and secure the slider pin 150 relative to the slide member 148.

FIG. 9 illustrates a cross section of the yoke assembly 106 and the connecting arms 156 in an installed configuration. As briefly described above, the bore 196 provides a passage that extends through the yoke 146. Further, the bore 196 is dimensioned to slidably receive each slide portion 208 of the slide members 148 in opposing ends thereof. The slide members 148 can thus be nested within the bore 196 and can slide independently within the bore 196 along their respective slide portions 208 (i.e., can move telescopically with the bore 196). Thus, in general, the slide members 148 move toward and away from the yoke axis 198, and transversely thereto, during operation. In the illustrated configuration, the slide members 148 are retracted fully into the bore 196, which may generally correspond to a 45 degree orientation of the actuator 100, although other configurations are possible.

In the illustrated configuration of FIG. 9, each slider pin 150 is seated within the respective notches 202 of the respective slide member 148. By sizing each of the notches 202 to thus receive the slider pin 150, each connecting arm 156 can be positioned closer to the yoke axis 198 when the yoke 146 is in the 45 degree (or other fully telescoped) orientation. By reducing the distance between the connecting arm 156 and the yoke axis 198, the maximum space required by the yoke assembly 106 and the rod assembly 136 in a direction transverse to the yoke axis 198 can accordingly be reduced, thereby allowing the use of a more compact housing.

Figure 10:
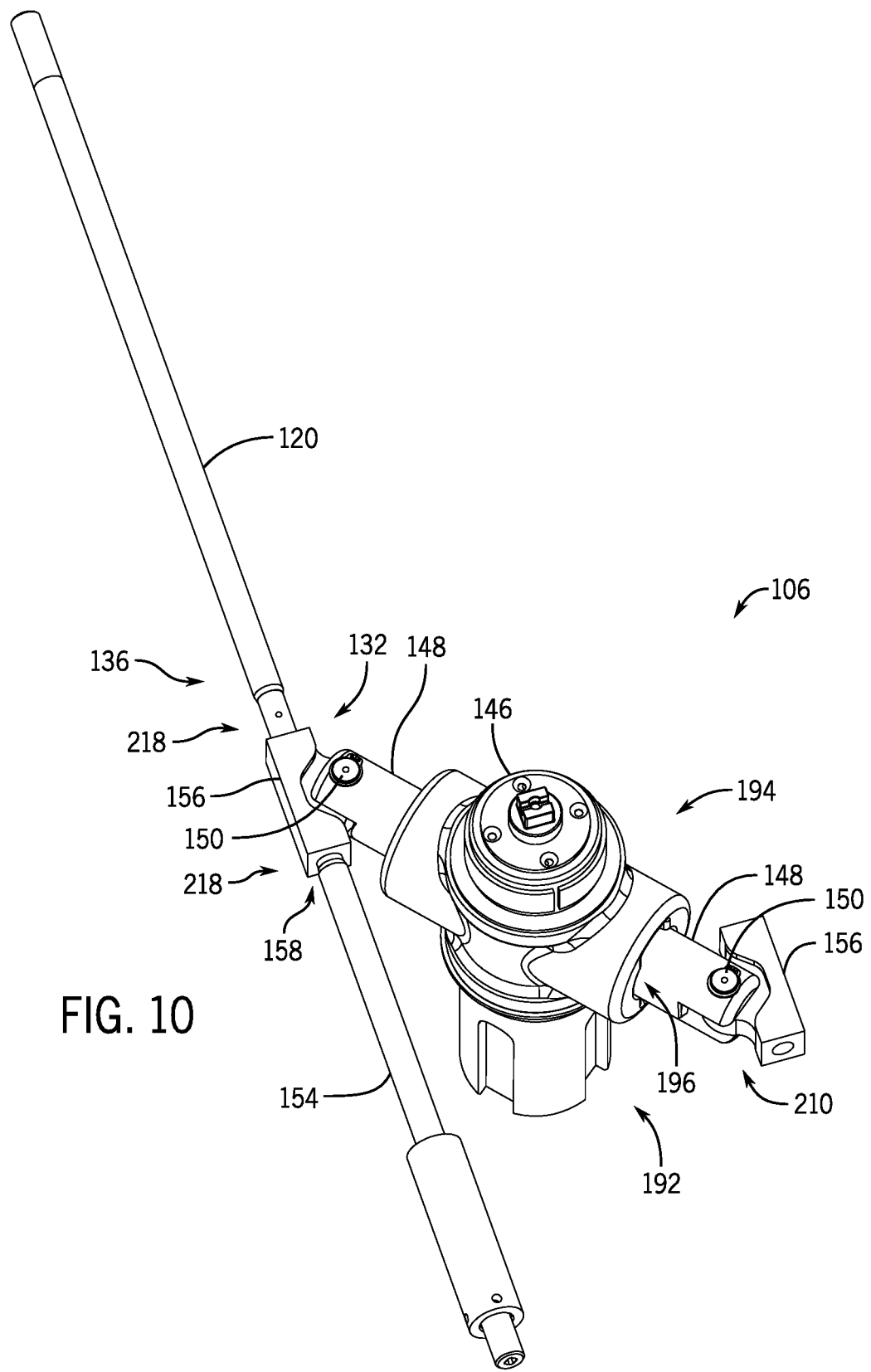
FIG. 10 is an isometric view of the rod assembly secured to the yoke assembly of the actuator of FIG. 1.

FIG. 10 illustrates the yoke assembly 106 pinned to one rod assembly 136. The other rod assembly (not shown) can be secured to the yoke assembly 106 in a substantially similar manner (see, for example, FIG. 12), and therefore the description of one rod assembly 136 and its securement to the yoke assembly 106 can be applied to the other rod assembly 136. In the illustrated embodiment, the piston rod 120 is secured to the connecting arm 156 via a threaded engagement of the threaded end 132 of the piston rod 120 with one of the threaded holes 222 of the connecting arm 156. Similarly, the guide rod 154 is secured to the connecting arm 156 via a threaded engagement of the threaded end 158 of the guide rod 154 with the other threaded hole 222 of the connecting arm 156.

In general, the piston rod 120 of one rod assembly 136 is configured to controllably move the one rod assembly 136 along the axis of the rod assembly 136 (e.g., in a first linear direction during actuation to open the valve). When one rod assembly 136 is moved by the piston rod 120 (e.g., transversely to the yoke axis 198 (see FIG. 9), the corresponding slide member 148 can pivot relative to the yoke 146 at the securing portion 210 of the slide member 148, thereby changing the angle of the slide member 148 relative to the rod assembly 136 and allowing the slide member 148 to slide telescopically within the bore 196. Thus, the slide member 148 can transfer the linear movement of the rod assembly 136 into torque on the yoke 146, for actuation of the valve assembly, without impeding the movement of rod assembly 136 or imposing substantial transverse loading on the rod assembly 136. Further, because the extended length of the slide member 148 can effectively engage the yoke 146 at the bore 196 even when at a minimum telescopic depth within the bore 196, the overall lateral size of the yoke 146 (i.e., along the bore 196) can be substantially reduced relative to conventional designs (e.g., with pin-and-slot configurations). Correspondingly, as similarly discussed relative to the notches 202 above, the illustrated design can allow the use of a substantially smaller housing than may be required with conventional designs.

Figure 11:
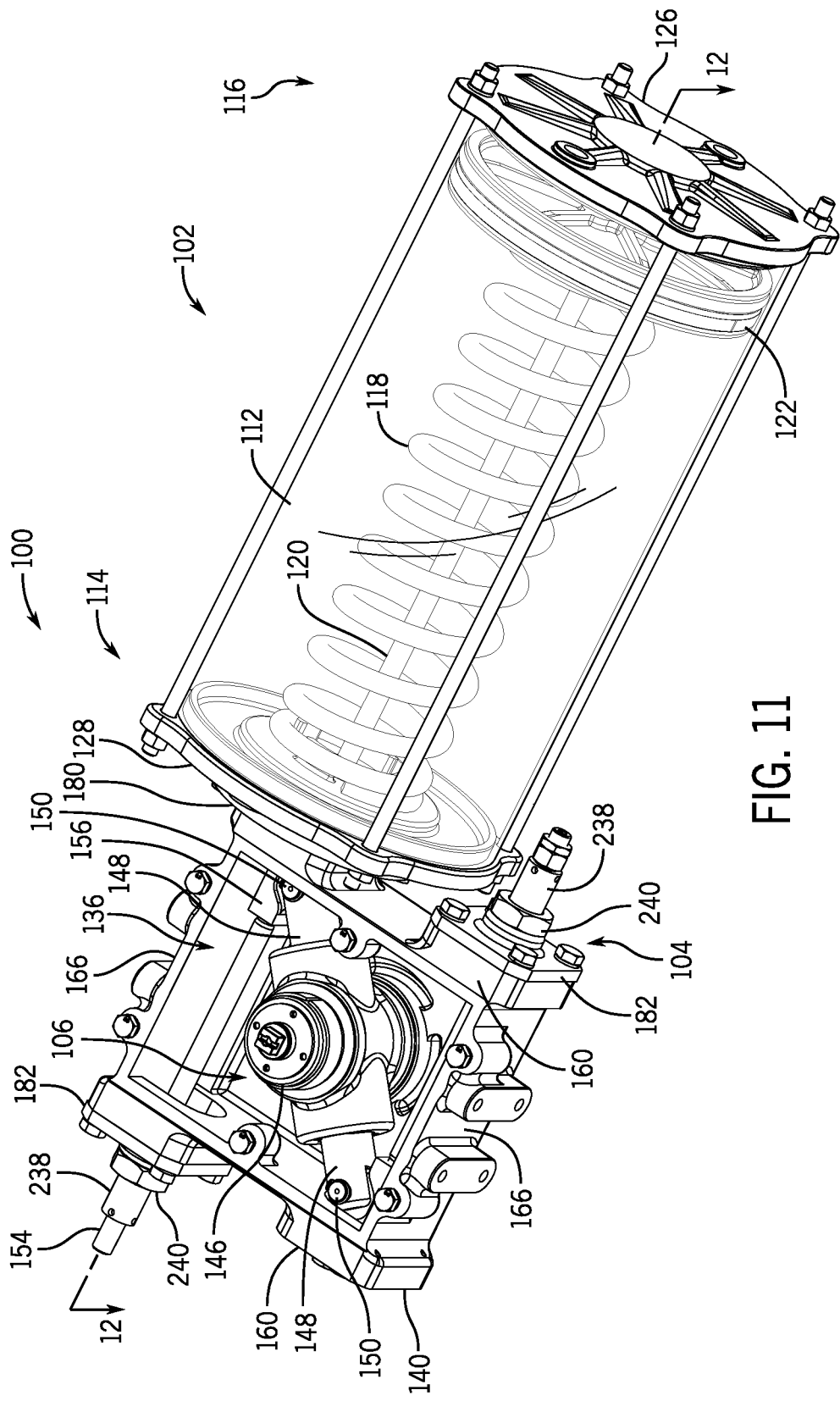
FIG. 11 is an isometric partial view of the cylinder assembly secured to the yoke assembly of the actuator of FIG. 1, with a cover of the housing assembly of FIG. 3 removed.
Figure 12:
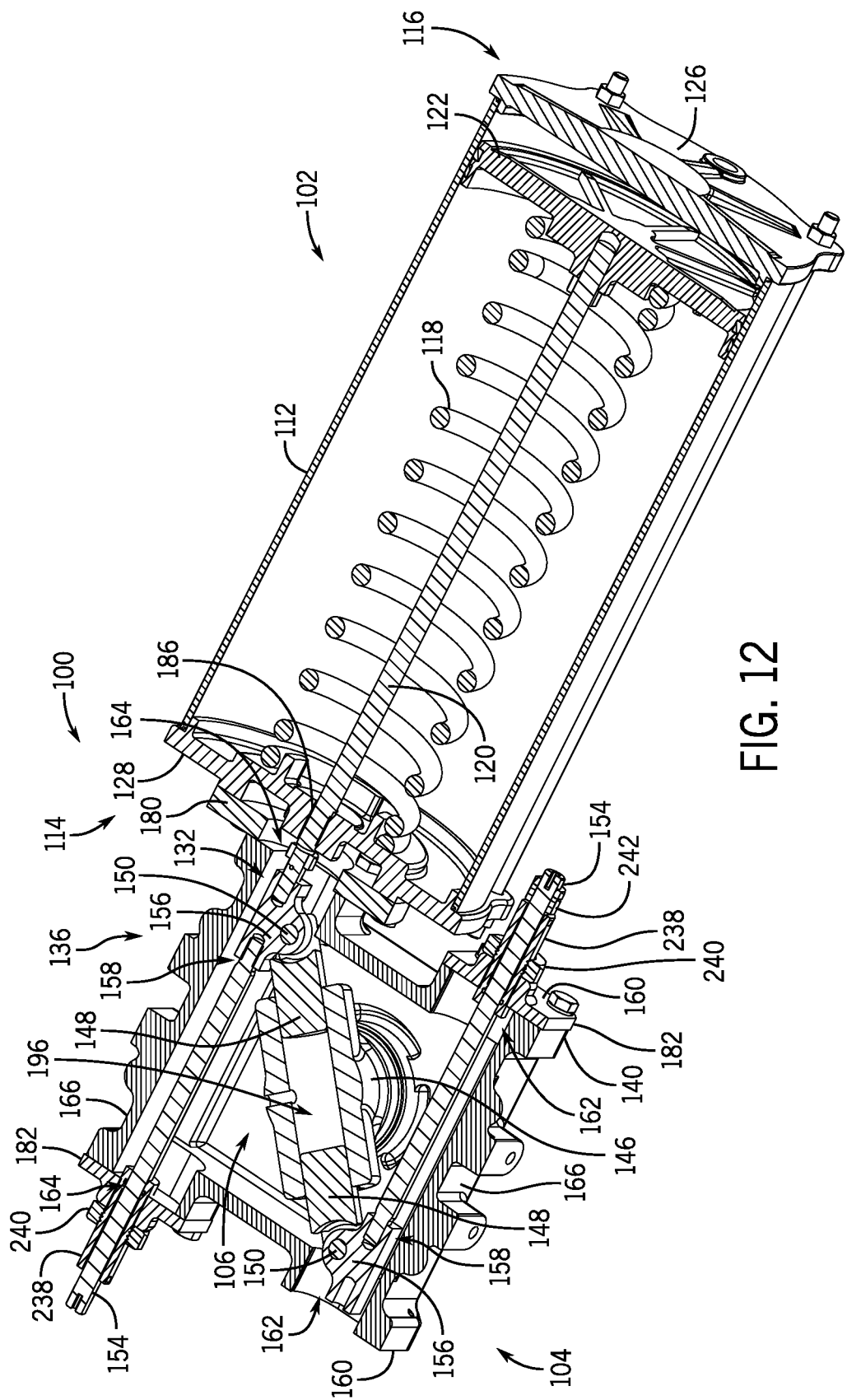
FIG. 12 is a cross-sectional isometric partial view of the cylinder assembly secured to the yoke assembly taken along line 12-12 of FIG. 11.

FIGS. 11 and 12 illustrate the yoke assembly 106 and each rod assembly 136 at least partially enclosed in the housing assembly 104. Further illustrated is one of the cylinder assemblies 102 secured to the housing assembly 104. The other cylinder assembly 102 (not shown in FIGS. 11 and 12) can be secured to the housing assembly 104 in a substantially similar manner (see, for example, FIG. 13), and therefore the description of the one cylinder assembly 102 and its securement to the housing assembly 104 can be applied to the other cylinder assembly 102.

In general, the rod assembly 136 extends across the base 140 of the housing assembly 104 transverse to the yoke axis 198 and is slidably supported at each of the first pair of opposing side walls 160. Thus, for example, the actuation movements described above relative to FIG. 10 can be implemented with notably high efficiency and notably low wear (e.g., due to reduced transverse loading on the rod assembly 136).

In particular, in the illustrated embodiment, the inner piston end cap 128 is secured to the end cap 180, to secure the cylinder assembly 102 to the housing assembly 104. The piston rod 120 extends through the through hole 186 of the end cap 128 (see FIG. 4), through one of the first pair of opposing sides 160 of the base 140 via the second passage 164 (see FIG. 4), and is threadably secured to the connecting arm 156. Thus, linear force from the cylinder assembly 102 can be effectively transmitted to the connecting arm 156, so that the corresponding slide member 148 can transmit torque to the yoke 146.

In general, it may be beneficial to slidably support the rod assembly 136 on at least one side, and in some cases both sides, of the housing assembly 104. In the illustrated example, the piston rod 120 is slidably supported by the inner piston end cap 128, as also discussed above. Further, the guide rod 154 is threadably secured to the connecting arm 156 opposite the piston rod 120 and extends through the other of the first pair of opposing sides 160 of the base 140 via the opposing passages 164 (see FIG. 4). In particular, the guide rod 154 is slidably supported by the end cap 182 (as also discussed below), so that the rod assembly 136 is thereby slidably supported on both sides of the housing assembly 104 and transverse deformation of the rod assembly 136 can be substantially avoided. In other embodiments, however, a guide rod may not be included or a rod assembly can be otherwise slidably supported.

Still referring to FIGS. 11 and 12, the rod assembly 136 further includes a limit stop bushing 238. In particular, in the illustrated embodiment, the actuator 100 includes a pair of limit stop bushings 238 that correspond to the pair of rod assemblies 136 (see FIG. 1). Correspondingly, each guide rod 154 can extend through a respective one of the limit stop bushings 238. Further, each limit stop bushing 238 is threadedly adjustable relative to the housing assembly 104 to adjust a limit stop location for the respective rod assembly 136 relative to linear movement of each rod assembly 136 to thereby limit the rotational movement of the yoke 146. For example, by adjusting the limit stop bushings 238 to extend further into the housing 104, movement of the rod assemblies 136 away from the cylinder assemblies 102 can be stopped sooner (e.g., via contact between the limit stop bushings 238 and the connecting arms 156 or other features of the rod assembly 236). Further, in some embodiments, a single limit stop bushing can limit rotation in two directions. For example, a nut 242 or other features on one or more of the guide rods 154 can be configured to contact a corresponding outer side of the associated limit stop bushing 238 (e.g., at a distance controlled by adjustment of the nut 242 along the guide rod 154) and thereby controllably limit movement of the rod assemblies 136 toward the cylinder assemblies 102.

In different embodiments, different structures can be used to secure and adjust a limit stop bushing and corresponding limit-stop locations. For example, in the illustrated embodiment, each limit stop bushing 238 directly, threadedly engages the corresponding end cap 182 and also extends through a respective nut 240. Thus, a position of the limit stop bushings 238 relative to the housing assembly 104 can be adjusted by rotating the limit stop bushings 238, and then locked by tightening the nuts 240. The nut 242 can also be similarly adjusted (and locked, as needed), as also discussed above. In other embodiments, however, other approaches are possible.

In some embodiments, use of the limit stop bushing 238 or other similar structures can also lead to structural improvements for the actuator 100 as a whole. For example, because a conventional extended side feature is no longer needed on the yoke 146 to provide limit-stop contact, the space required for rotation of the yoke 146 can be reduced, along with the overall size of the housing assembly 104. Further, the limit stop bushings 238 provide a smaller number of limit stop contact and adjustment points than conventional designs, which are also aligned along the movement axis of the corresponding rod assembly 136, rather than offset relative thereto. This can allow for simpler—and therefore less error-prone—adjustment to limits of a range of rotation of the yoke 146 as well as improved stress distribution overall, including due to the elimination of the potential for off-axis loading on the housing assembly 104 due to misalignment of multiple limit stops for a single one of the rod assemblies 136.

Notably, relative to some conventional designs, the illustrated embodiment may exhibit favorable characteristics during assembly and disassembly as well as during operation, including due to comparatively simplified assembly/disassembly operations that are facilitated by the structures describe above. During an assembly or a disassembly of the actuator 100, for example, the connecting arm 156 may be moved in or out of the housing assembly 104 via one of the first or second passages 162, 164 while remaining threadably secured to the piston rod 120. For example, during a disassembly of the actuator 100, the cover 142 of the housing assembly 104 may be removed from the base 140. The pin installation tool 228 may be used to disengage the slider pin 150 from the connecting arm 156. The piston inner end cap 128 may be then disconnected from the end cap 180 (and the housing base 140 generally), and the cylinder assembly 102, with the connecting arm 156 still attached, so that both the piston rod 120 and the connecting arm 156 can be moved away from the yoke assembly 106, with the connecting arm 156 passing through the corresponding first or second passage 162, 164. A similar, yet reverse, process may be also be used to assemble the actuator 100.

As another example of the benefits of the illustrated design, the independent aspect of the end caps 180, 182 can also help to provide improved performance and longevity. For example, because each of the end caps 180, 182 can be aligned and secured entirely separately from each of the others, a support axis for the associated component of the associated rod assembly 136 (e.g., of one of the piston rods 120 or guide rods 154) can be independently adjusted. Thus, an optimal alignment of opposite-side (or other) supports for each of the rod assemblies 136 can be achieved relatively easily and reliably and is not necessarily dependent on tight machining tolerances of the housing 104.

Figure 13:
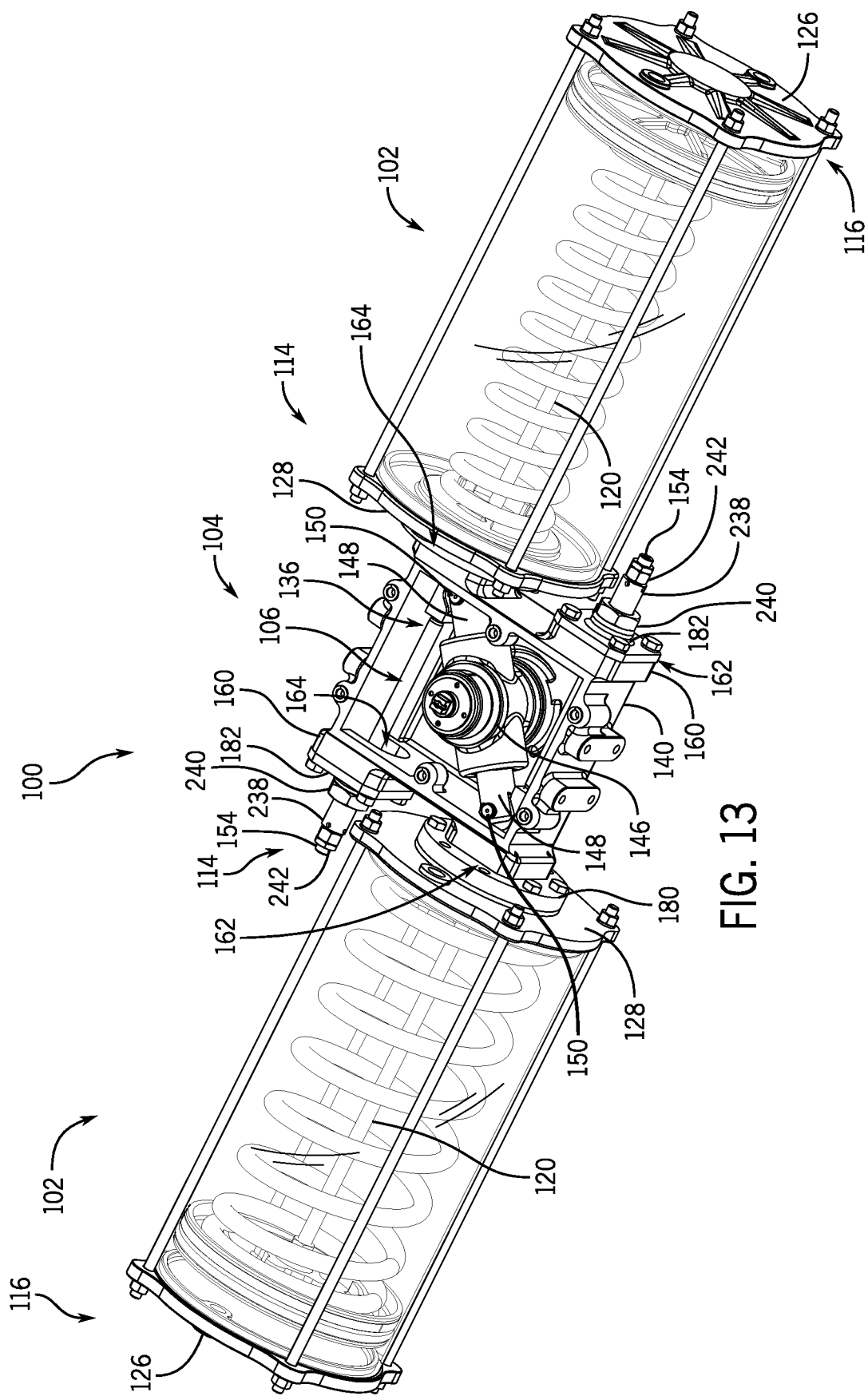
FIG. 13 is an isometric view of the actuator of FIG. 1, with a cover of the housing assembly of FIG. 3 removed.

FIG. 13 illustrates the actuator 100 assembled according to one embodiment of the invention (with the housing cover 142 removed for clarity of presentation). In general, as also noted above, the end caps 128, 180, 182 can be secured to the housing assembly 104 at any one of the passages 162, 164, thereby allowing the actuator 100 to be assembled, without reorientation of the housing base 140, in either of two respective orientations to provide either of two opposite rotational modes for the yoke assembly 106. For example, in another orientation than is shown in FIG. 13, one of the sets of end caps 128, 180 and the corresponding cylinder assembly 102 can be moved from the first passage 162 to the second passage 164 on one of the first pair of opposing side walls 160. Correspondingly, the other of the sets of end caps 128, 180 and the corresponding cylinder assembly 102 can be moved from the second passage 164 to the first passage 162 in the other of the first pair of opposing side walls 160. Likewise, the end caps 182 can be readily relocated in a corresponding matter to provide opposing-side support for the associated rod assemblies 136.

In some embodiments, differently configured components can be used to secure a cylinder assembly to a housing assembly. For example, some embodiments can include a housing base that includes a single large opening on each of two opposing sides thereof and a corresponding set of two end caps. Each of the end caps can be configured to support both a piston rod of a first rod assembly and a guide rod of a second rod assembly, so that the two end caps collectively provide opposite-side support for two rod assemblies of the actuator.

Figure 14:
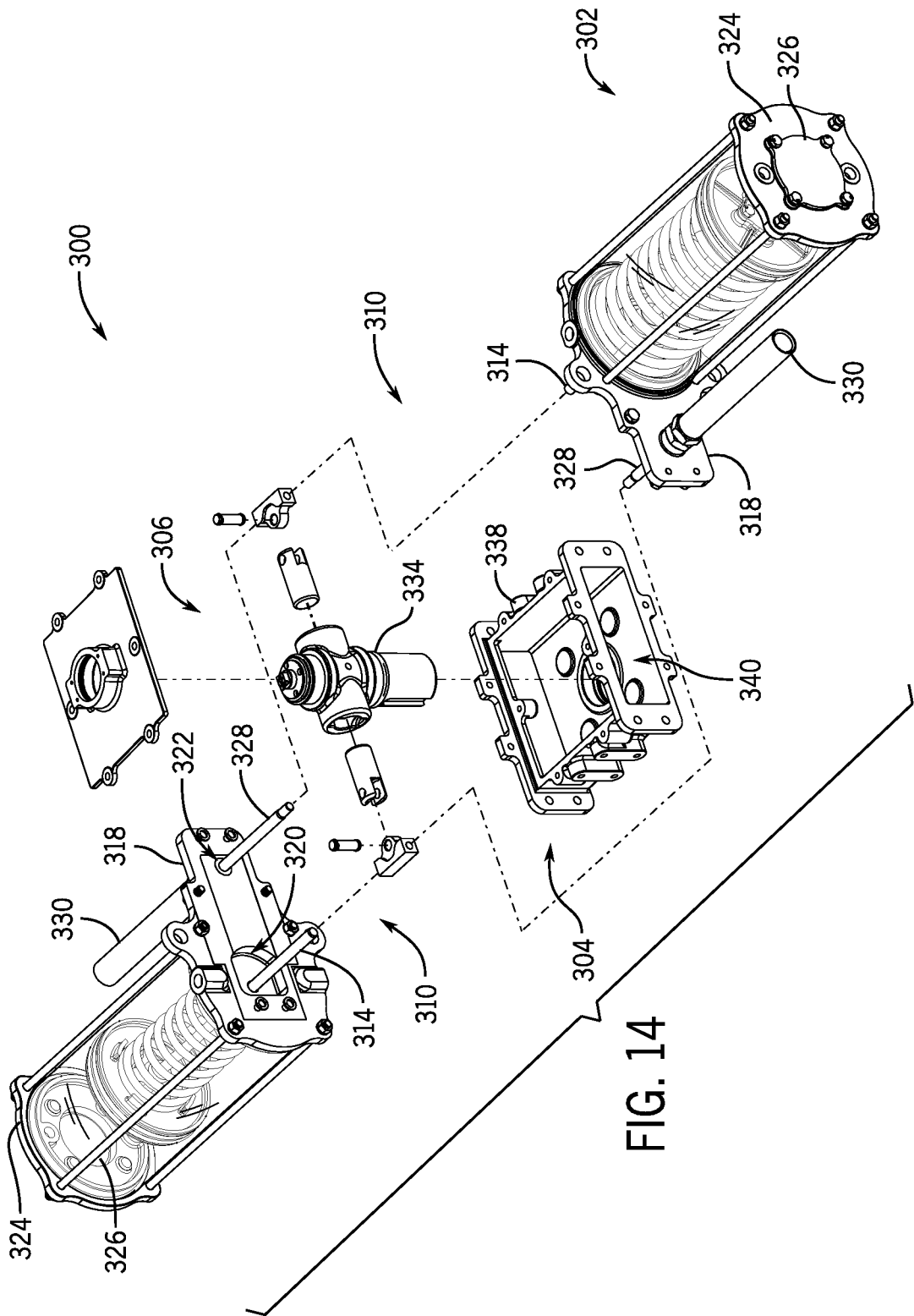
FIG. 14 is an exploded isometric view of an actuator for a valve assembly according to another embodiment of the invention.

In this regard, for example, FIG. 14 illustrates an actuator 300 according to another embodiment of the invention. Generally, the actuator 300 can be used with a valve similar to the actuator 100 described above and can operate similarly to the actuator 100. In particular, similar to the actuator 100, the actuator 300 includes a cylinder assembly 302, a housing assembly 304, and a yoke assembly 306. Various components of the actuator 300, including the yoke assembly 306, are substantially similar to corresponding components of the actuator 100, and therefore will not be described in particular detail, with discussion of corresponding components of the actuator 100 generally also applying to the actuator 300. For example, the actuator 300 further includes a pair of rod assemblies 310 that are generally similar (e.g., substantially identical) to the rod assemblies 136 of the actuator 100, and discussion of the rod assemblies 136 generally applies to the rod assemblies 310.

In some regards, however, the actuator 300 differs from the actuator 100. Like the rod assemblies 136, the rod assemblies 310 each include a respective piston rod 314 that is part of the respective cylinder assembly 302. However, in contrast to the cylinder assemblies 102, each of the cylinder assemblies 302 is configured to engage a single end cap 318 so that the piston rod 314 extends through a first opening 320 defined by the end cap 318. Moreover, the end cap 318 further defines a second opening 322 that is dimensioned to receive and support a guide rod 328 therein of a different one of the rod assemblies 310 that engage the cylinder assembly 302 that is secured to the corresponding end cap 318. In the illustrated embodiment, a guide-rod shield 330 can also be secured to the end cap 318 proximate to the second opening 322, to receive the guide rod 328 therein. When the actuator 300 is fully assembled, each of the end caps 318 is secured to an opposing side of the housing assembly 304, to support the corresponding cylinder assembly 302 and guide rod 328 with the yoke assembly 306 and with the opposing guide rod 328 and cylinder assembly 302, respectively.

Continuing, each cylinder assembly 302 includes a cylinder end cap 324 and a cylinder access cap 326 secured to the cylinder end cap 324. During an assembly or disassembly of the actuator 300, the cylinder access cap 326 can be removed from the cylinder assembly 302 to access the piston rod 314. The piston rod 314 can then be screwed or unscrewed from the connecting arm 366 to secure or remove the cylinder assembly 302 relative to the housing assembly 304. Additionally, to remove the cylinder assembly 302 relative to the housing assembly 304, the end cap 318 can be disconnected from the shell 338, as shown in FIG. 14.

Figure 15:
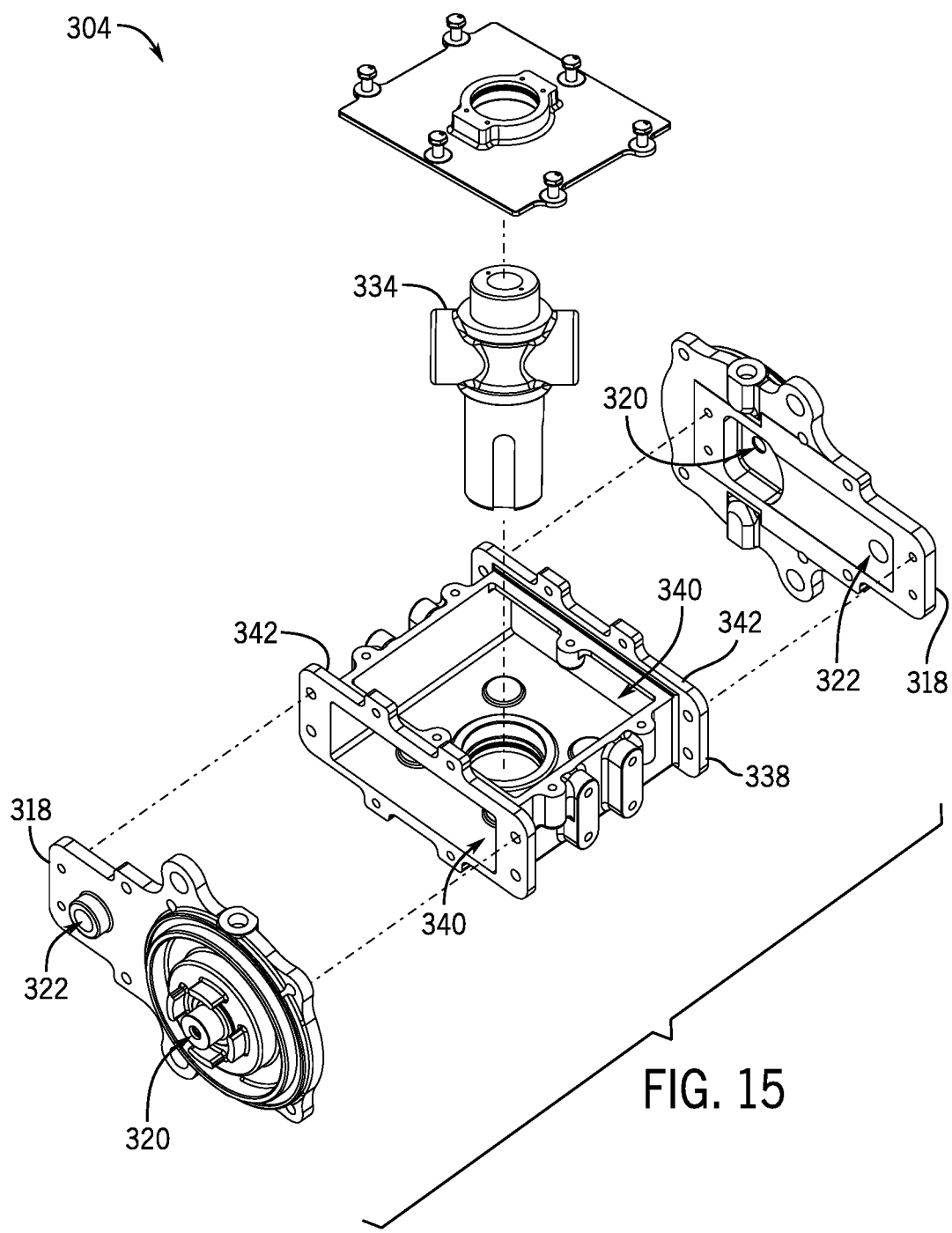
FIG. 15 is an exploded isometric view of a yoke and a housing assembly of the actuator of FIG. 14.

FIG. 15 illustrates the housing assembly 304 and a yoke 334 of the yoke assembly 306 that is configured to be at least partially enclosed by the housing assembly 304. In particular, the housing assembly 304 includes a shell 338 with openings 340 on opposing sides 342. Each end cap 318 is configured to engage the shell 338 proximate to the respective opening 340, and generally support each rod assembly 310. Similar to the actuator 100, each end cap 318 is configured to engage either of the opposing sides 342 of the shell 338 to provide two orientations of the housing assembly 304 which provide either of two opposite rotational modes for the yoke assembly 306. However, whereas the rotational mode of the actuator 100 can be changed without necessarily removing the end caps 180, 182 (see FIG. 11), removal of the end caps 318 may be necessary to change the rotational mode of the actuator 300.

Figure 16:
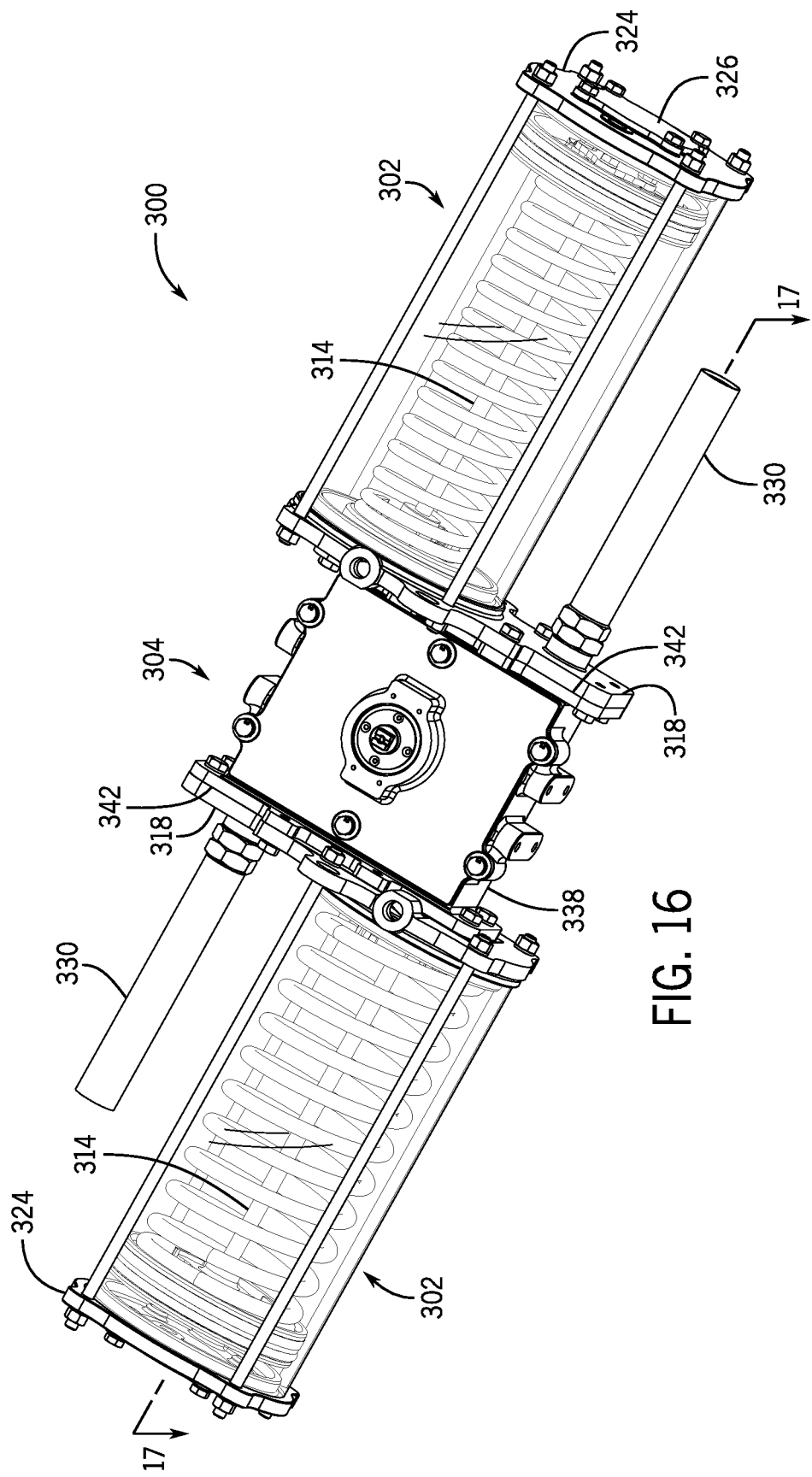
FIG. 16 is an isometric view of the actuator of FIG. 14.

In this regard, for example, FIG. 16 illustrates a first orientation of the actuator 300 and housing assembly 304 for a first rotational mode. To obtain a different orientation and a different rotational mode, each of the end caps 318, including the respective cylinder assemblies 302 and shields 330 secured thereto, can be removed from each of the opposing sides 342 of the shell 338, rotated 180 degrees, and then secured to the original sides 342 of the shell 338. The rod assemblies 310 can then be reassembled and secured to the yoke assembly 306 (e.g., as described above), and operation in the different rotational mode can proceed without any need to remove the yoke 334 from the associated valve (not shown) or to remove and rotate the housing shell 338.

Figure 17:
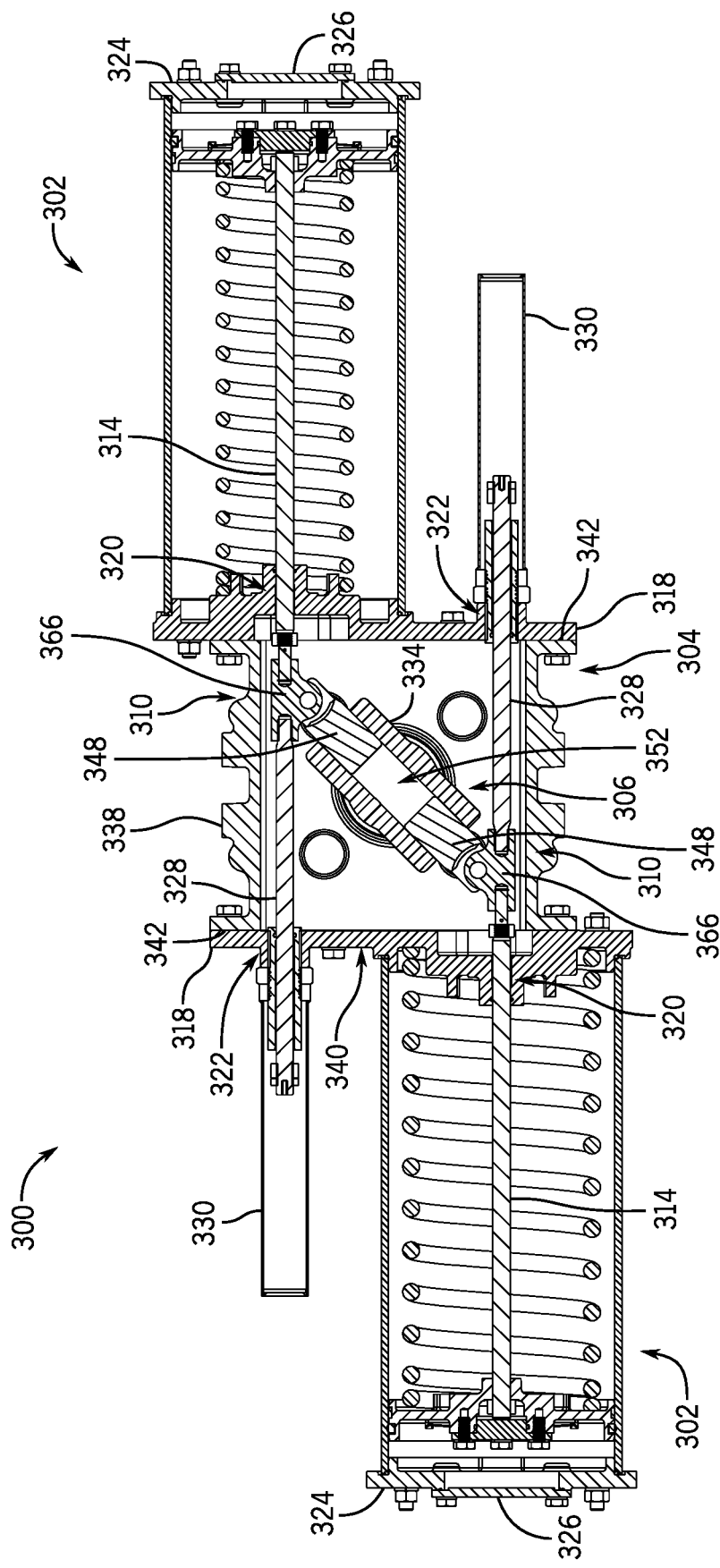
FIG. 17 is a top cross-sectional view of the actuator of FIG. 14 taken along line 17-17 of FIG. 16.
Figure 18B:
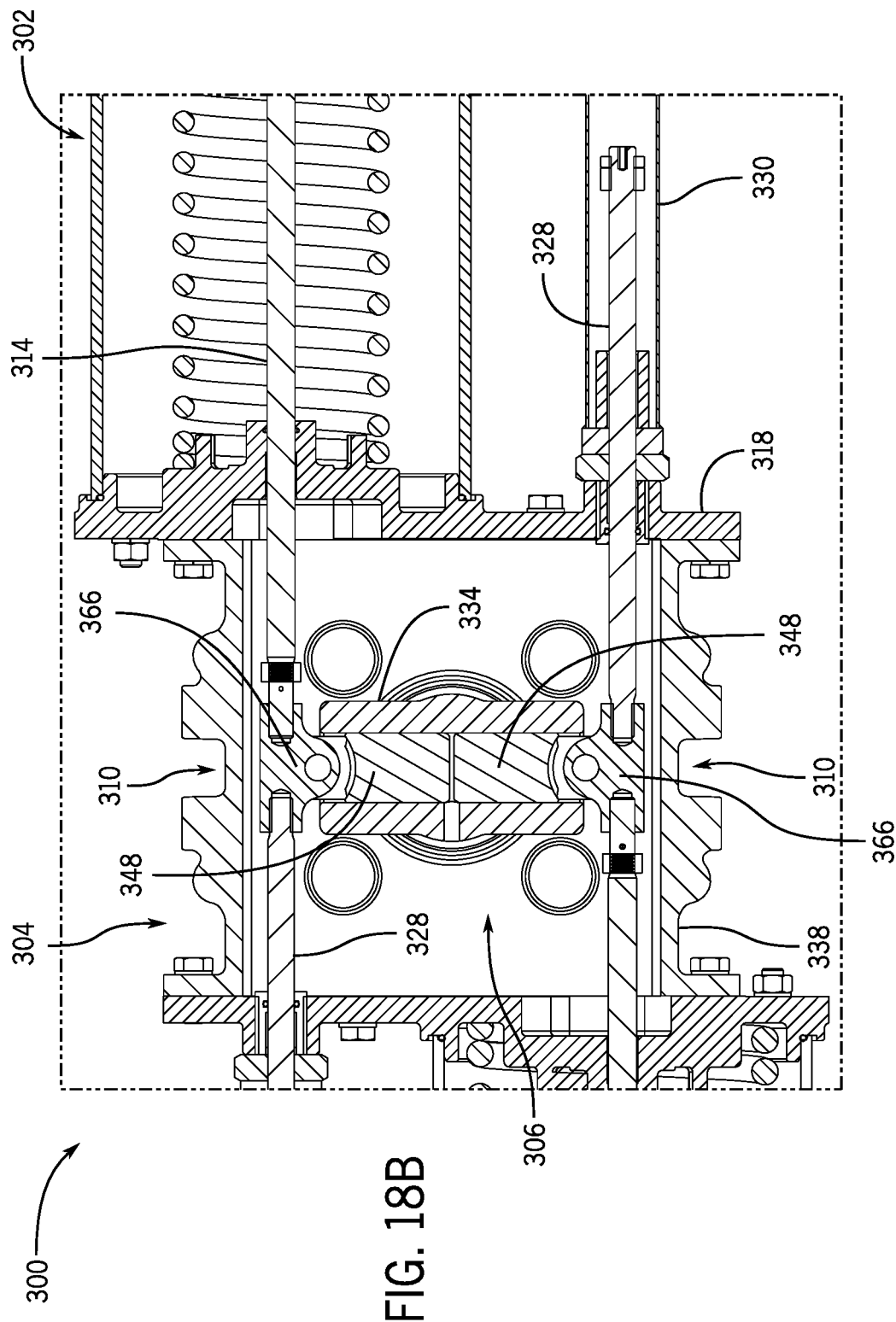
FIG. 18B is a top cross-sectional partial view of the actuator of FIG. 14 in a 45 degree rotational orientation.
Figure 18C:
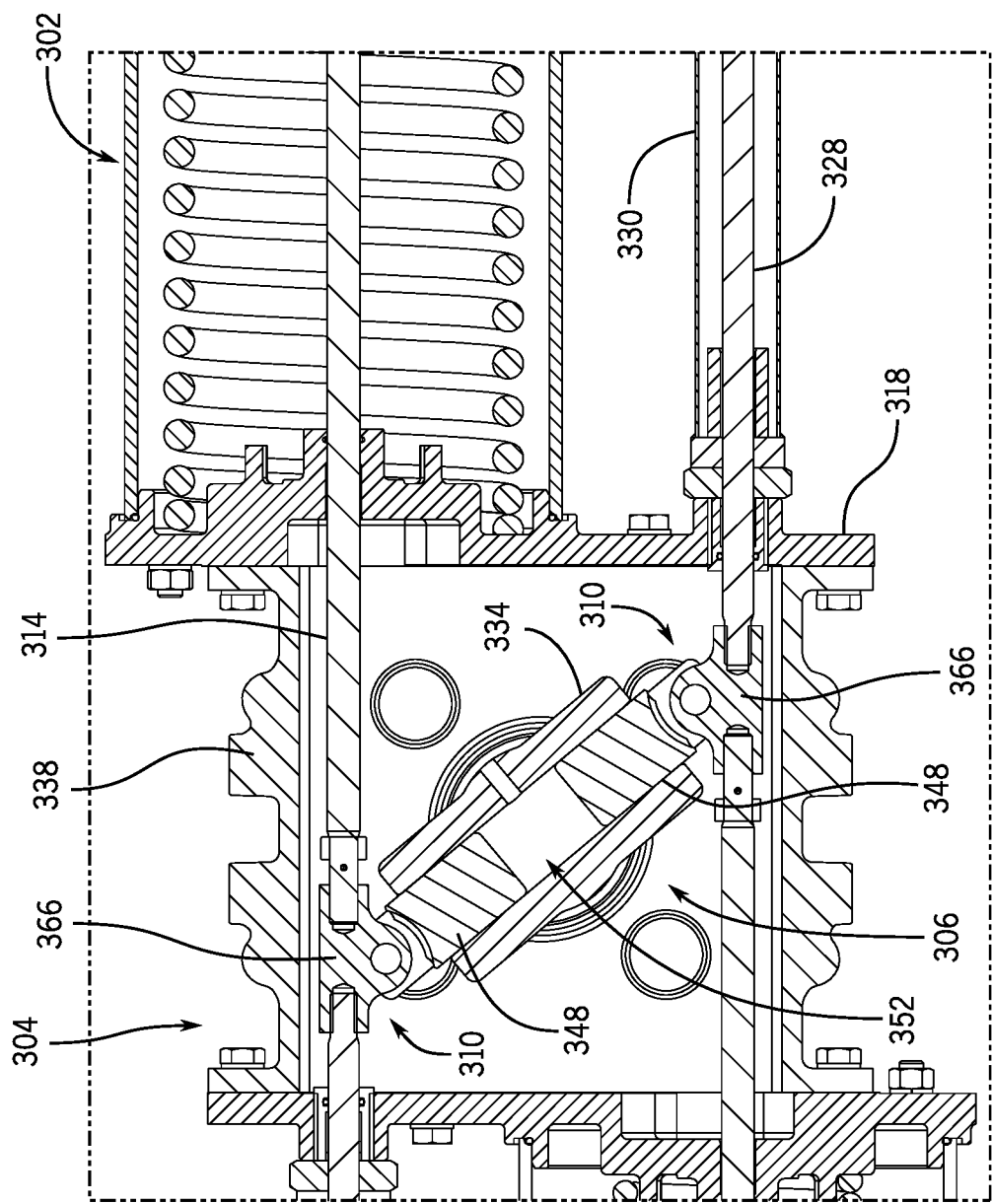
FIG. 18C is a top cross-sectional partial view of the actuator of FIG. 14 in a 90 degree rotational orientation.

FIG. 17 illustrates a cross section of the actuator 300 shown in FIG. 16, with the illustrated orientation of the yoke assembly corresponding to a 0 degree rotational orientation. Similar to the actuator 100, the actuator 300 is configured to operate between the 0 degree rotational orientation and a 90 degree rotational orientation. For example, FIGS. 18A-C illustrate varying orientations of the yoke assembly 304 and the rod assembly 310 within the shell 338. In particular, FIG. 18A illustrates the 0 degree rotational orientation, in which slide members 348 are telescoped outwardly from a bore 352 of the yoke 334. FIG. 18B illustrates the 45 degree rotational orientation, in which the slide members 348 are telescoped inwardly into the bore 352 of the yoke 334. FIG. 18C illustrates the 90 degree rotational orientation, in which the slide members 348 are again telescoped outwardly from the bore 352 of the yoke 334. Each of the 0 degree and 90 degree rotational orientations correspond to the maximum diagonal length required by the yoke assembly 306 and rod assemblies 310 within the housing assembly 304. Further, in contrast to conventional designs—and similarly to the actuator 100—the yoke assembly 306 is at a minimum length at the 45 degree rotational orientation. Correspondingly, the overall size of the housing assembly 304 can be substantially smaller than may be required for conventional designs.

Figure 19C:
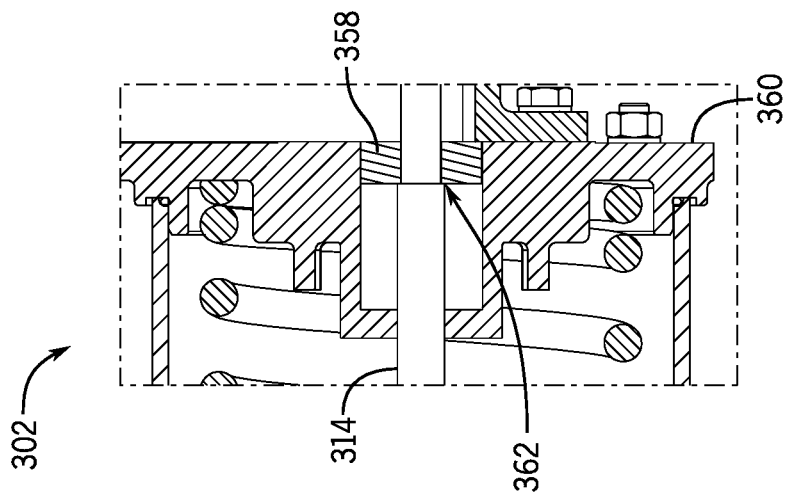
FIG. 19C is a top cross-sectional partial view of the cylinder assembly of FIG. 19A with the piston rod extending through the sliding bushing in a third position.
Figure 19B:
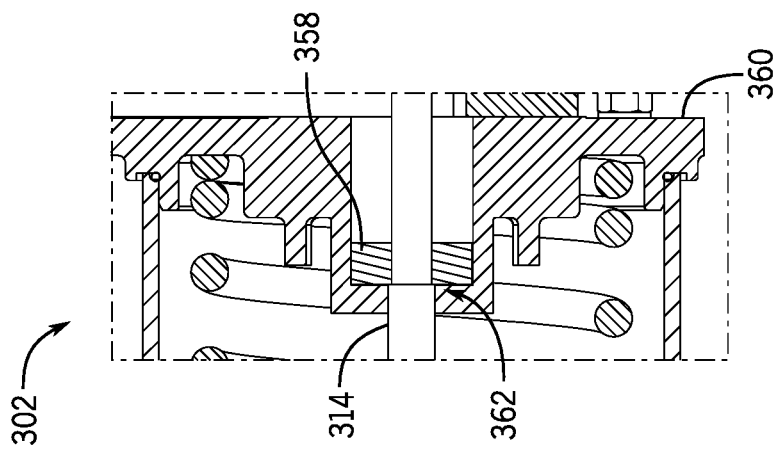
FIG. 19B is a top cross-sectional partial view of the cylinder assembly of FIG. 19A with the piston rod extending through the sliding bushing in a second position.
Figure 19A:
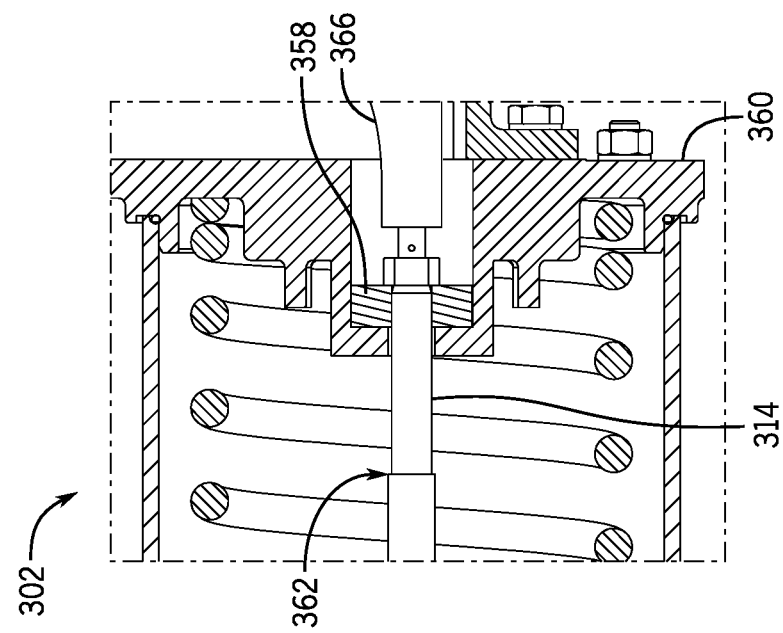
FIG. 19A is a top cross-sectional partial view of a cylinder assembly of the actuator of FIG. 14 with a piston rod extending through a sliding bushing a first position.

In some embodiments, a sliding support can be used for a rod assembly, including to reduce the potential moment on a rod assembly at particular rotational orientations of the associated actuator. In this regard, for example, FIGS. 19A-C show a detailed view of the piston rod 314 within the cylinder assembly 302. In the illustrated embodiment, the cylinder assembly 302 further includes a sliding bushing 358 that is slidably moveable, and slidably supports the piston rod 314, within an inner piston end cap 360. To facilitate desired movement of the sliding bushing 358, the piston rod 314 is configured as a stepped rod and includes a shoulder 362 that contacts the sliding bushing 358 after a predetermined movement of the piston rod 314 in a first direction (e.g., to open the associated valve). The shoulder 362 can then urge the sliding bushing 358 to move with the rod 314 in the first direction (i.e., as shown via the movement of the sliding bushing 358 from FIG. 19B to FIG. 19C). During a return movement of the piston rod 314, the sliding bushing 358 can then be moved in a second direction by other mechanisms, such as by engagement of a connecting arm 366 of the rod assembly 310 with the sliding bushing 368. Thus, the sliding bushing 358, or other similarly movable sliding bushings, can reduce any transverse forces on the piston rod 314 from within the housing assembly 304 as the piston rod 314 advances. Similar features can also be applied in other embodiments, including relative to the actuator 100 discussed above.

Figure 20:
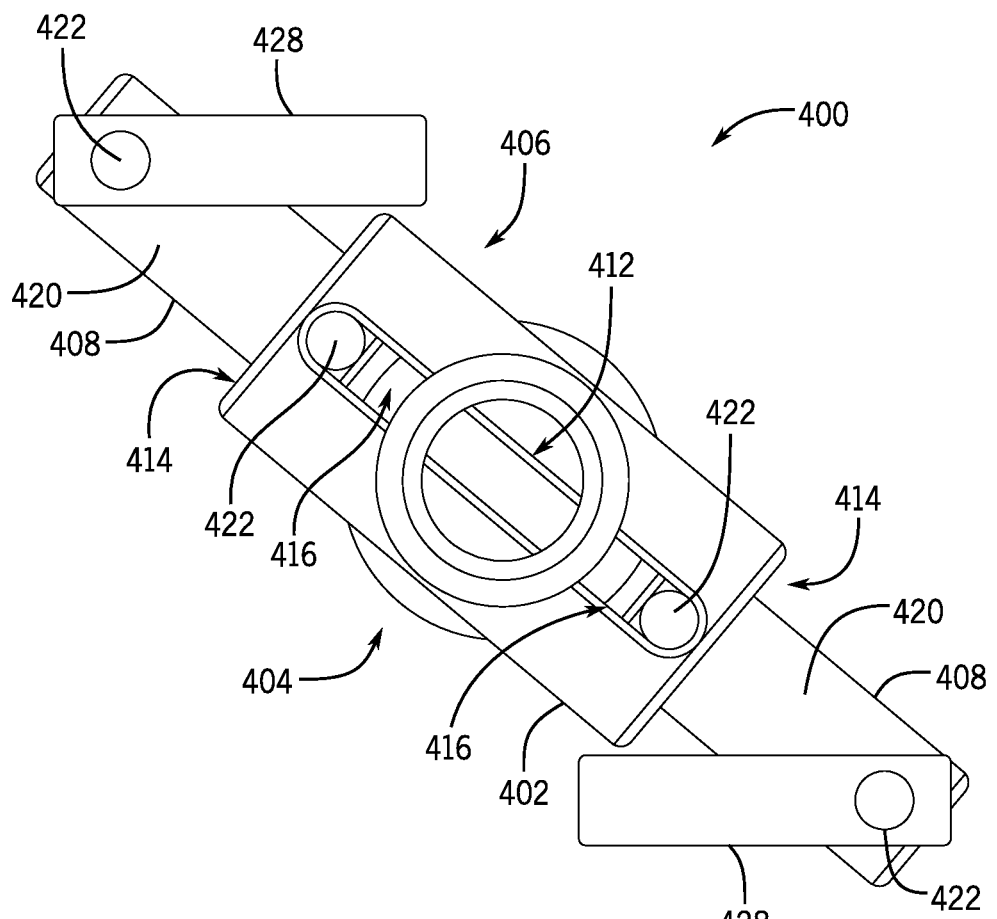
FIG. 20 is a top view of a yoke assembly in a first position according to an embodiment of the invention.
Figure 21:
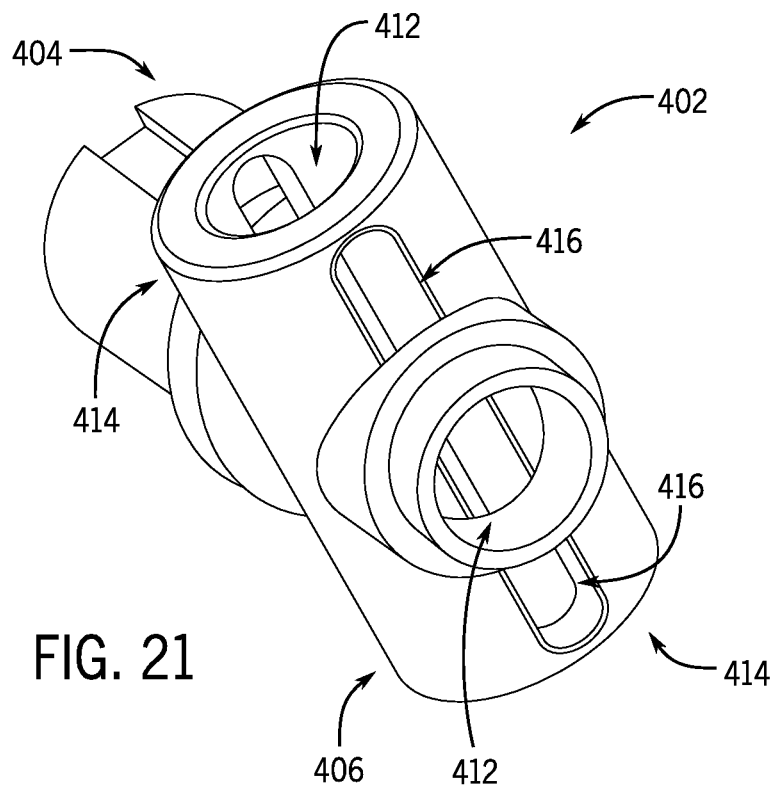
FIG. 21 is an isometric view of a yoke of the yoke assembly of FIG. 20.

As briefly discussed above, some embodiments further include differently configured components to actuate a valve, including differently configured structures for engagement of a slide member with a yoke. For example, some embodiments can include a yoke assembly having closed-end slots to engage pins of slide members that can be pinned to a rod assembly. In this regard, for example FIGS. 20 and 21 illustrate a yoke assembly 400 according to another embodiment of the invention. Generally, the yoke assembly 400 can be used in a variety of Scotch yoke actuators, such as the actuators 100 and 300, for example. Similar to the yoke assembly 106, the yoke assembly 400 includes a yoke 402, a valve engagement portion 404, a rod-securing portion 406, slide members 408, and a guide rod 428. Likewise, the rod-securing portion 406 defines a passage 412, with opposing ends 414 that are dimensioned to slidably receive the slide members 408 (see FIG. 20). Thus, as similarly discussed above, the slide members 408 can move telescopically with the yoke 402 to transmit torque to the yoke 402.

Figure 22:
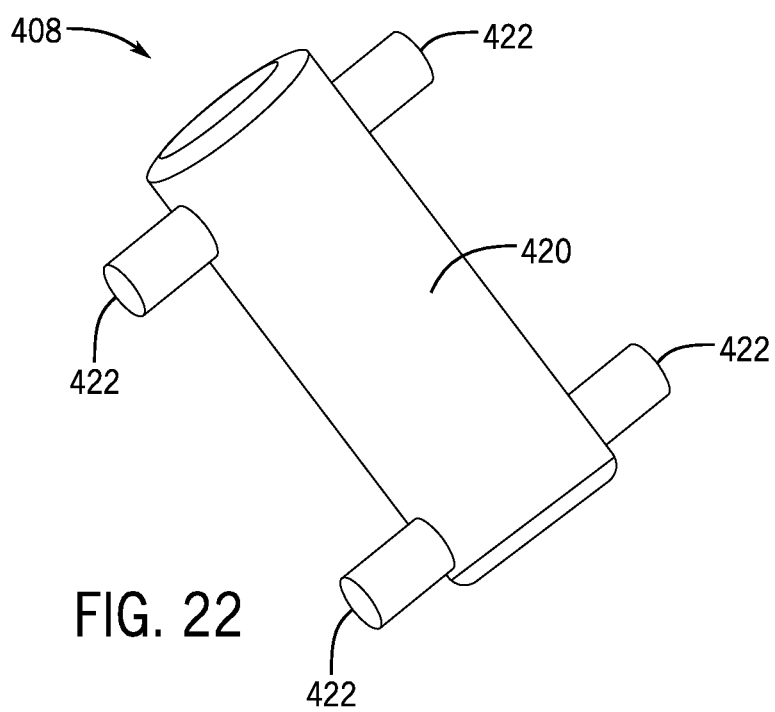
FIG. 22 is an isometric view of a slide member of the yoke assembly of FIG. 20.

In contrast to the example yokes illustrated in preceding figures, however, the rod-securing portion 406 includes a set of slots 416 that each extend between the two opposing ends 414 of the passage 412. In particular, the slots 416 are configured as closed-end slots that extend continuously between opposing ends of the passage 412, although other configurations are possible. Similarly, in contrast to the slide members illustrated in preceding figures, as illustrated in FIG. 22, the slide member 408 includes a slide body 420 and bearing members 422 that extend therefrom. In particular, the bearing members are configured as two solid pins that extend fully through the slide body 420, although other configurations are possible.

Figure 23:
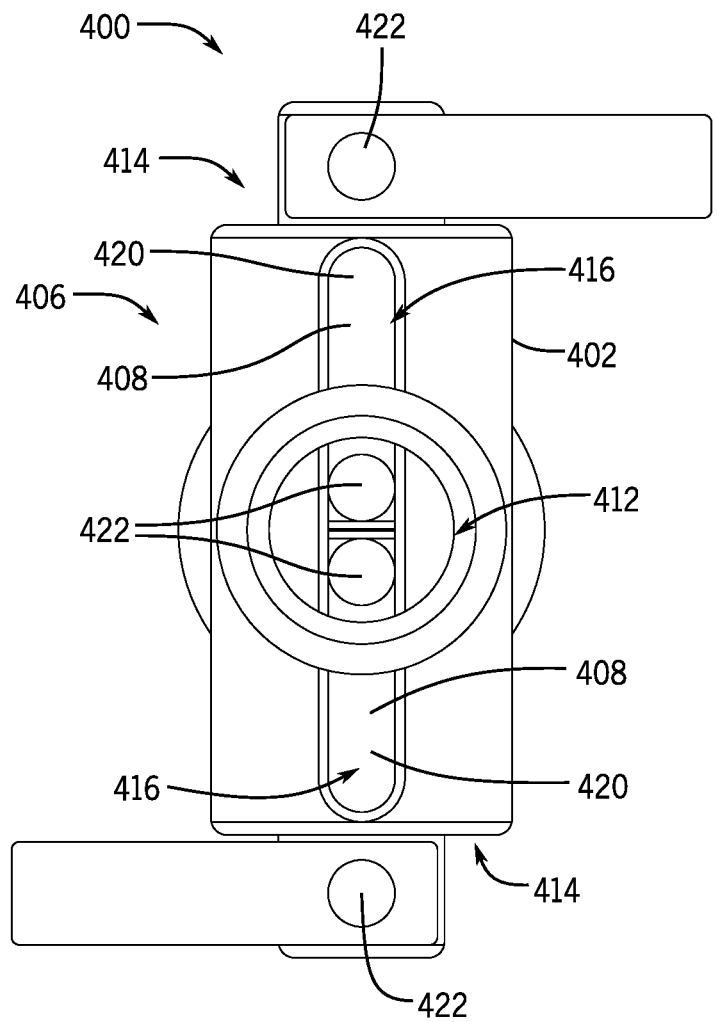
FIG. 23 is a top view of the yoke assembly of FIG. 20 in a second position.

In some embodiments, the slots 416 and the bearing members 422 can help to provide improved stress distribution during engagement of the yoke 402 by the slide members 408. As illustrated in FIG. 23, the bearing members 422 at one end of the slide member 408 are configured to extend through the slots 416 when the slide bodies 420 are received within the passage 412, whereas the bearing members 422 at another end of the slide members are configured to pivotally secure the slide members 408 to associated rod assemblies. Thus, as the slide bodies 420 slide telescopically within the passages 412, as driven by the rod assemblies, the bearing members 422 can slide within the slots 416. Correspondingly, the bearing members 422 within the slots 416 can help to provide more favorable stress distributions within the yoke 402 and the slide members 408 during operation. Generally, configurations with slotted yoke passages, including those similar to the configuration illustrated in FIGS. 20-23, can be used with a variety of actuators, including the actuators 100, 300 discussed above.

FIGS. 24-30 illustrate additional configurations of yoke assemblies according to some embodiments of the invention. In general, each of the yoke assembly 400 described above and the various yoke assemblies described below are suitable for use with a variety of actuators, including the actuators 100 and 300, for example. Further, each of the yoke assemblies below operate substantially similarly to the yoke assembly 106 of the actuator 100. As a result, details of operation of the yoke assembly 106 as described above can be generally applied to the yoke assemblies below.

Figure 24:
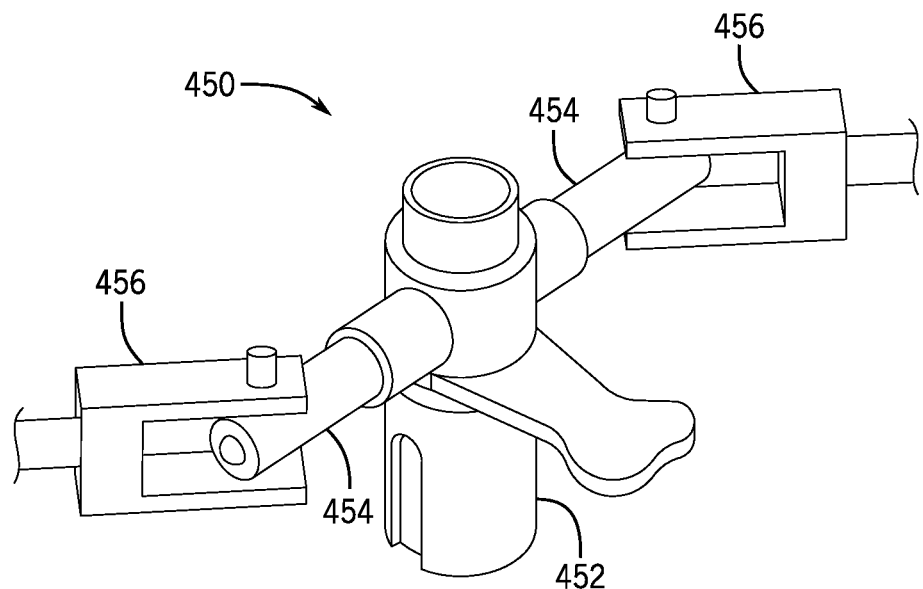
FIG. 24 is an isometric view of a yoke assembly according to another embodiment of the invention.

FIG. 24 illustrates a yoke assembly 450 including a yoke 452 and slide members 454 that can slide telescopically within a bore of the yoke 452. Each slide member 454 includes opposing free ends, one of which extends telescopically into the yoke 452 and the other of which is configured to pivotably engage a connecting arm 456 of a rod assembly. In the illustrated embodiment, the connecting arm 456 of the rod assembly is configured as a clevis which can be pivotably coupled to the slide member 454 via a slide pin.

Figure 25:
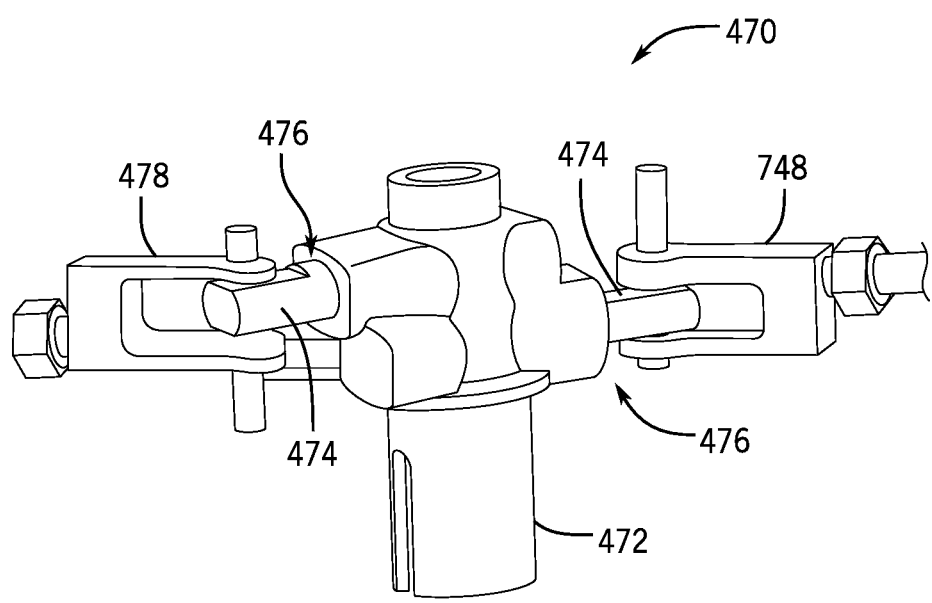
FIG. 25 is an isometric view of a yoke assembly according to another embodiment of the invention.

FIG. 25 illustrates a yoke assembly 470 including a yoke 472 and a set of slide members 474 that can each slide within one of a respective set of bores 476. In the illustrated embodiment, each of the bores 476 defines a bore axis. Each bore axis is substantially parallel to the other, but extends in a separate plane. As a result, each slide member 474 is able to slide the full length of its respective bore 476 (or a substantial portion, e.g., more than half, thereof) without contacting the other slide member 474. Similar to the yoke assembly 450, each slide member 474 includes a free end that is configured to pivotally engage a connecting arm 478 of a rod assembly.

Figure 26:
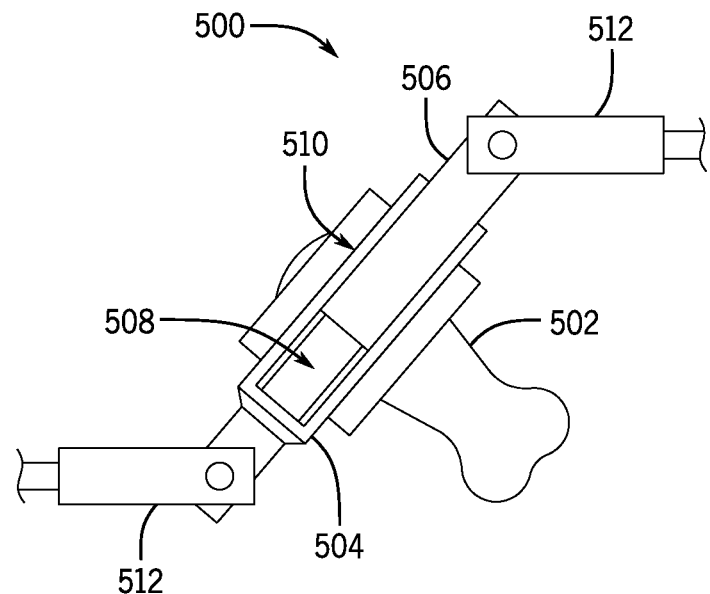
FIG. 26 is a partial cross-sectional isometric view of a yoke assembly according to another embodiment of the invention.

FIG. 26 illustrates a yoke assembly 500 including a yoke 502 and a set of slide members 504, 506. The first slide member 504 includes a passage 508 that is dimensioned to receive the second slide member 506 and the yoke 502 includes a bore 510 that is dimensioned to receive the first slide member 504. The first slide member 504 is thus configured to slide telescopically within the bore 510 and the second slide member 506 is configured to telescopically slide within the passage 508 of the first slide member 504. Each of the slide members 504, 506 include a free end that is configured to pivotally engage a connecting arm 512 of a rod assembly.

Figure 27:
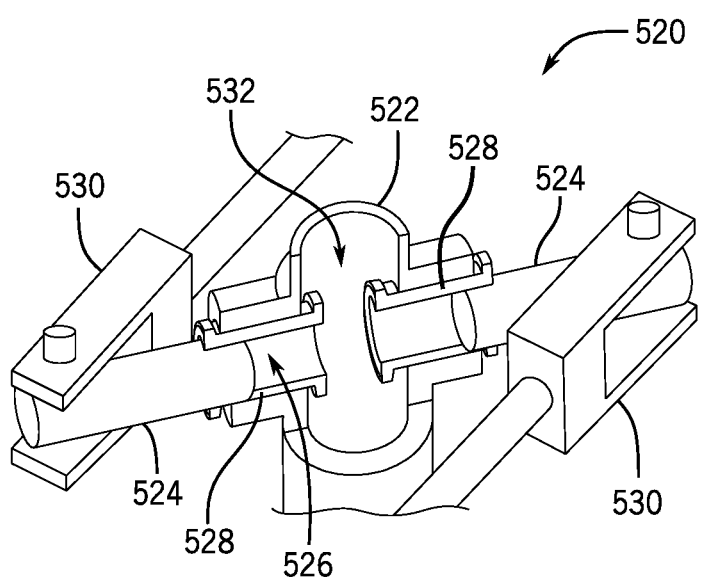
FIG. 27 is a partial cross-sectional isometric view of a yoke assembly according to another embodiment of the invention.

FIG. 27 illustrates a yoke assembly 520 including a yoke 522 and a pair of slide members 524. The yoke 522 includes a bore 526 dimensioned to receive a pair of bushings 528, and each of the bushings 528 is configured to slidably receive a respective slide member 524 for telescopic movement. Each of the slide members 524 includes opposing free ends, one of which is configured to pivotally engage a connecting arm 530 of a rod assembly. In the illustrated embodiment, the bore 526 is part of an interior passage 532 that extends through the yoke 522, although similar bushings can be used with other passages having different configurations.

Figure 28:
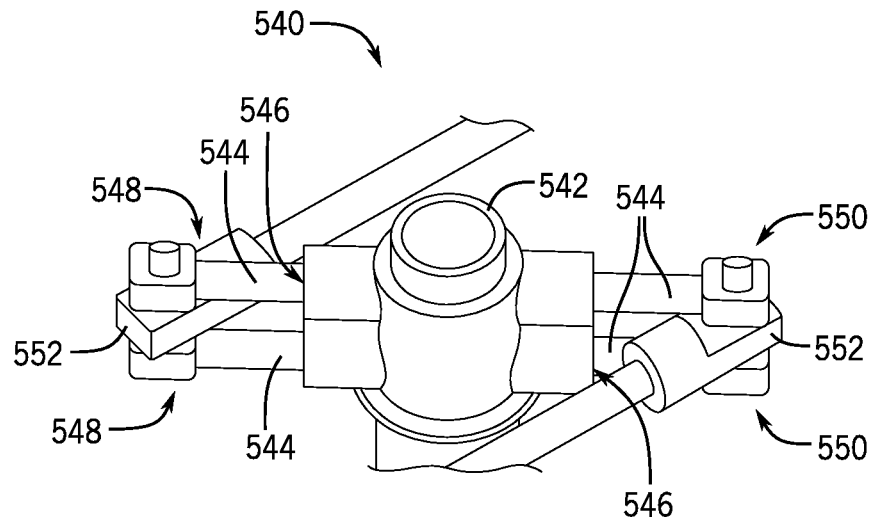
FIG. 28 is an isometric view of a yoke assembly according to another embodiment of the invention.

FIG. 28 illustrates a yoke assembly 540 including a yoke 542 and a set of slide members 544 that extend into a respective set of bores 546 formed in the yoke 542. The bores 546 extend fully through the yoke 542 along bore axes that are parallel but vertically offset along an axis defined by the yoke 542. Similarly, the slide members 544 extend in parallel, but vertically offset. Each of the slide members 544 include a first free end 548 and a second free end 550, with the respective free ends 548 configured to pivotably engage a corresponding connecting arm 552 of a rod assembly and the respective second free ends 550 configured to telescopically slide within a corresponding one of the bores 546.

Figure 29:
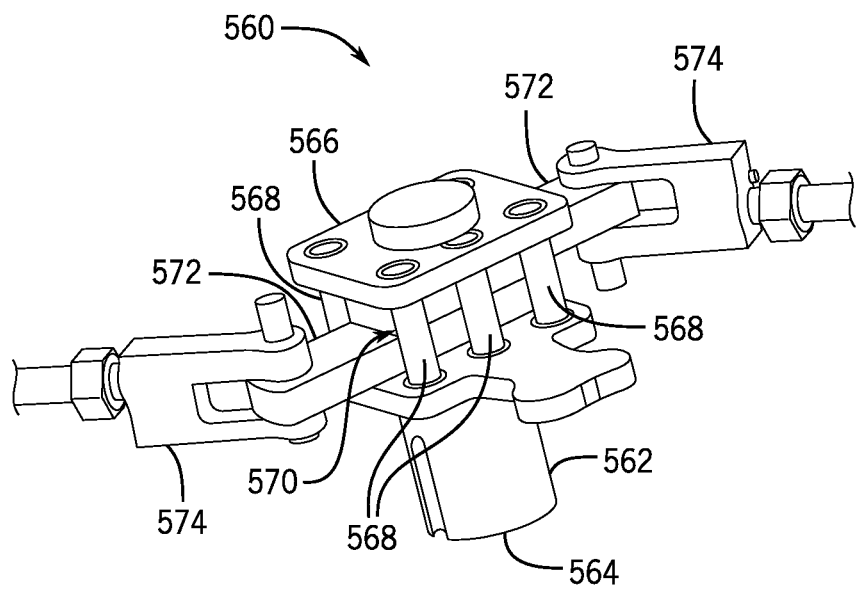
FIG. 29 is an isometric view of a yoke assembly according to another embodiment of the invention.

FIG. 29 illustrates a yoke assembly 560 including a yoke 562 having a first valve-engagement portion 564 and a second rod-securing portion 566. The first yoke portion 564 is configured to engage a valve portion of an actuator. The second yoke portion 566 is secured to the first yoke portion 564 via a plurality of pins 568 while remaining sufficiently separated from the first yoke portion 564 to define a passage 570 therebetween. The yoke assembly 560 further includes a pair of sliders 572. Each of the sliders 572 include a first free end that can slide past a portion of the other slider 572 within the passage 570. Each slider 572 also includes a second free end that is configured to pivotably engage a connecting arm 574 of a rod assembly.

The configuration in FIG. 29 may be particularly beneficial, for example, in reducing wear on relevant components while avoiding material limitations that may inhere to certain manufacturing approaches. For example, the first and second yoke portions 564, 566 can be relatively cheaply cast from conventional materials, whereas the pins 568 can be formed from a different, non-cast material having relatively high strength and durability. Thus, as well as securing the first and second yoke portions 564, 566 together, the pins 568 can serve as high-strength bearing members along which the sliders 572 can slide to transmit torque to the yoke 562 overall.

Figure 30A:
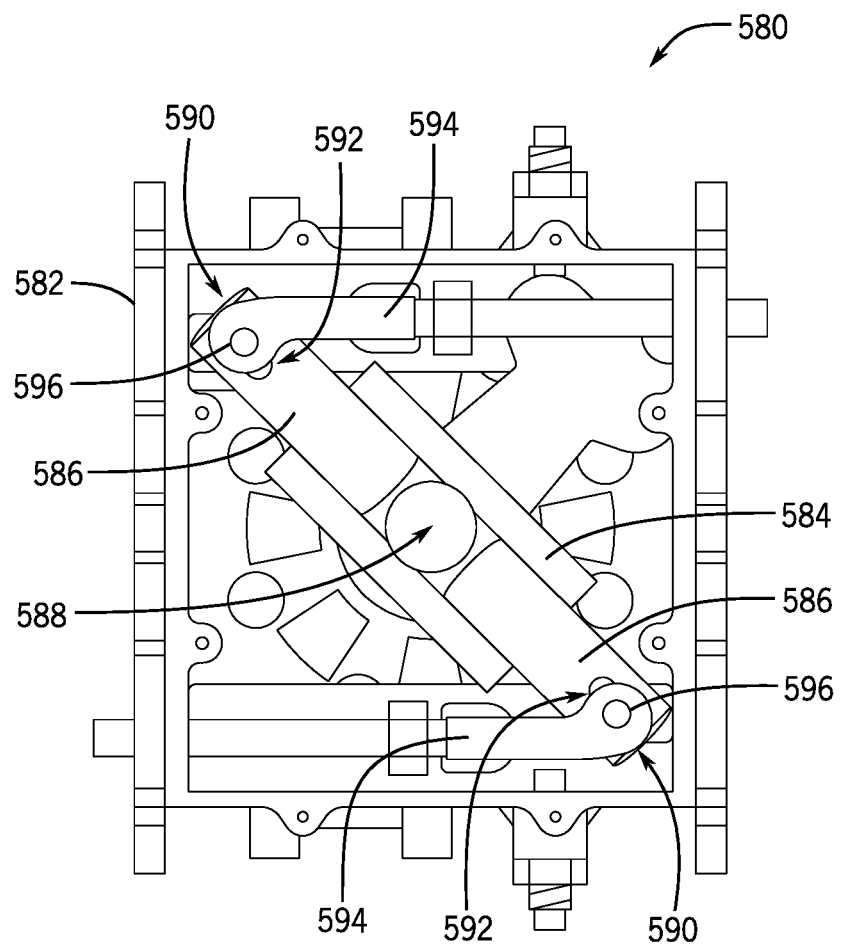
FIG. 30A is a top view of a yoke assembly within a housing, the yoke assembly in a 0 degree rotational orientation, according to one embodiment of the invention.
Figure 30B:
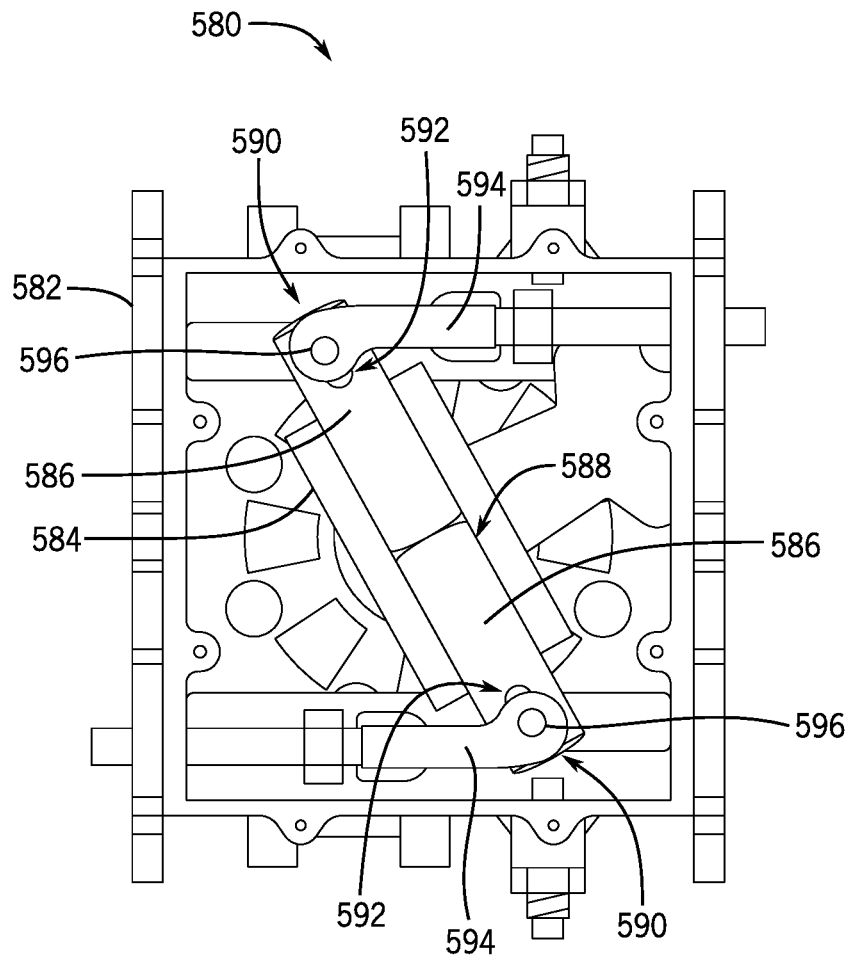
FIG. 30B is a top view of the yoke assembly of FIG. 30A, the yoke assembly in an intermediate rotational orientation.
Figure 30C:
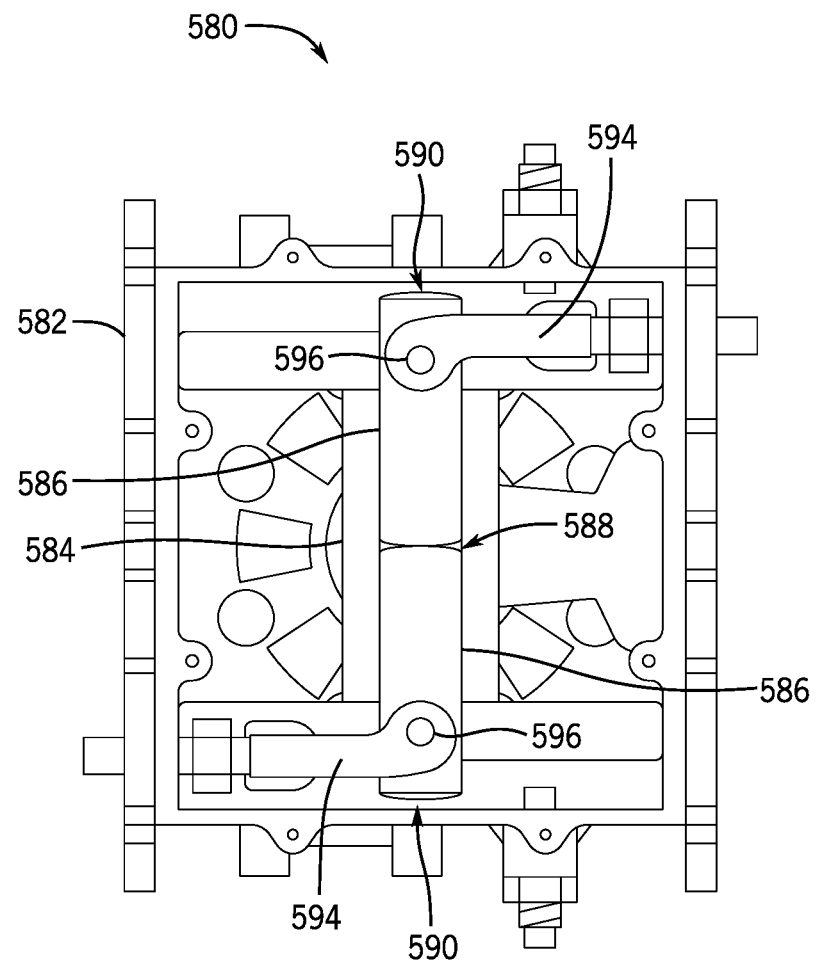
FIG. 30C is a top view of the yoke assembly of FIGS. 30A and 30B, the yoke assembly in a 45 degree rotational orientation.

In some embodiments, a rod assembly can be secured to a slide member so that the slide member can move with two degrees of freedom relative to the rod assembly (e.g., in rotation and translation). In this regard, for example, FIGS. 30A-C illustrate a yoke assembly 580 within a housing 582. The yoke assembly 580 includes a yoke 584 and a pair of slide members 586 that extend telescopically into a bore 588 formed in the yoke 584. Each of the slide members 586 include a first free end 590 that extends outside of the bore 588 and each first free end 590 includes a slot 592 formed therein. Each slide member 586 is configured to pivotably engage a connecting arm 594 of a rod assembly at the slot 592 via a slider pin 596 that has a diameter smaller than an elongate length of the slot 592. Correspondingly, the slider pin 596 is configured to move along the length of the slot 592 as the rod assembly moves linearly and the yoke 584 rotates about a yoke axis.

FIG. 30A illustrates the yoke assembly 580 in a 0 degree rotational orientation, in which the slide members 586 are each telescopically extended by a maximum distance from the bore 588 and the slider pin 596 is positioned at a distal end of the slot 592. FIG. 30B illustrates the yoke assembly 580 in an intermediate rotational orientation (i.e., between 0 and 45 degrees), in which the slide members 586 are each telescopically retracted into the bore 588 and the slider pin 596 is still positioned at the distal end of the slot 592. In contrast, FIG. 30C illustrates the yoke assembly 580 in a 45 degree rotational orientation, in which the slide members are each telescopically retracted by a maximum distance into the bore 588 and the slider pin 596 is positioned at a medial end of the slot 592. In general, the slot 592 can thus facilitate use of a compact design for the housing 582 without compromising torque capabilities of the yoke assembly 580 and can also, similarly to other pin-and-slot configurations discussed above, help to provide favorable stress distributions during operation.

In some implementations, devices or systems disclosed herein can be utilized, manufactured, or installed using methods embodying aspects of the invention. Correspondingly, description herein of particular features, capabilities, or intended purposes of a device or system is generally intended to inherently include disclosure of a method of using such features for the intended purposes, a method of implementing such capabilities, a method of manufacturing relevant components of such a device or system (or the device or system as a whole), and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the invention, of the utilized features and implemented capabilities of such device or system.

Figure 31:
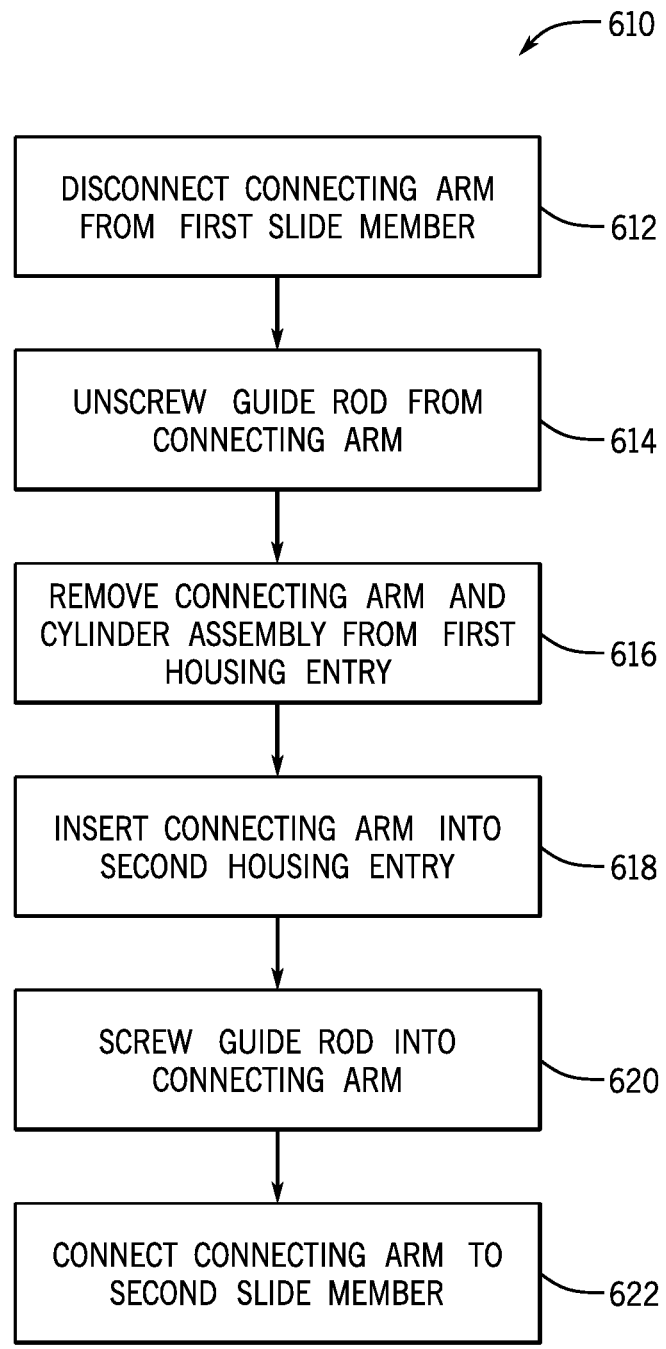
FIG. 31 is a flowchart illustrating a method of reversing a rotational mode of a Scotch yoke actuator for a valve.

In this regard, for example, FIG. 31 illustrates a method 610 for reversing a rotational mode of a Scotch yoke actuator for a valve. By way of example, the method 610 will be described below with reference to the actuator 100 (see also FIGS. 1-13), although other actuators can be used. Operation 612 of method 610 includes disconnecting the connecting arm 156 from the slide member 148 within the housing assembly 104. Prior to disconnecting the connecting arm 156 from the slide member 148, the slide member 148 can be pivotally supported by the connecting arm 156 for telescopic movement within the bore 196 of the yoke 146. Operation 614 of method 610 includes unscrewing the guide rod 154 from the connecting arm 156, which can be implemented before or after disconnecting the connecting arm 156 from the slide member 148.

Operation 616 of method 610 includes removing the connecting arm 156 from the housing assembly 104. For example, the connecting arm 156 can be removed from the base 140 of the housing assembly 104 via one of the first or second passages 162, 164 on one of the first pair of opposing side walls 160. Correspondingly, the connecting arm 156, which remains secured to the piston rod 120, can be moved away from the housing assembly 104 by moving the cylinder assembly 102.

Operation 618 of method 610 includes inserting the connecting arm 156 into the other of the first or second passage 162, 164 on the same side one of the first pair of opposing side walls 160 without flipping or reversing the orientation of the base 140. The cylinder assembly 102 can then be secured relative to the housing assembly 104. Continuing, operation 620 of the method 610 includes inserting the guide rod 154 into the other of the first or second passage 162, 164 on the same side one of the first pair of opposing side walls 160 without flipping or reversing the orientation of the base 140 (i.e., directly opposite the first or second passage 162, 164 into which the connecting arm 156 was inserted at operation 618) and screwing the guide rod 154 into the connecting arm 156. Operation 622 of method 610 includes connecting the connecting arm 156 to the other slide member 148 within the base 140 of the housing assembly 104. In this regard, for example, rather than requiring rotation of a housing assembly, as may correspondingly require detaching of a yoke from a valve, embodiments of the invention can beneficially allow for rotational modes of an actuator to be changed without disconnecting the actuator from the associated valve.

As also noted above, other approaches are also possible. For example, in some cases, a rod assembly can be disconnected from a connecting arm and the connecting arm can remain within a housing (e.g., still attached to a slide member) as the rod assembly is removed. The corresponding actuator can then be reoriented as appropriate (e.g., as discussed above) and then reattached, with a corresponding reattachment of the rod assembly to the same (or a different) connecting arm.

Figure 32:
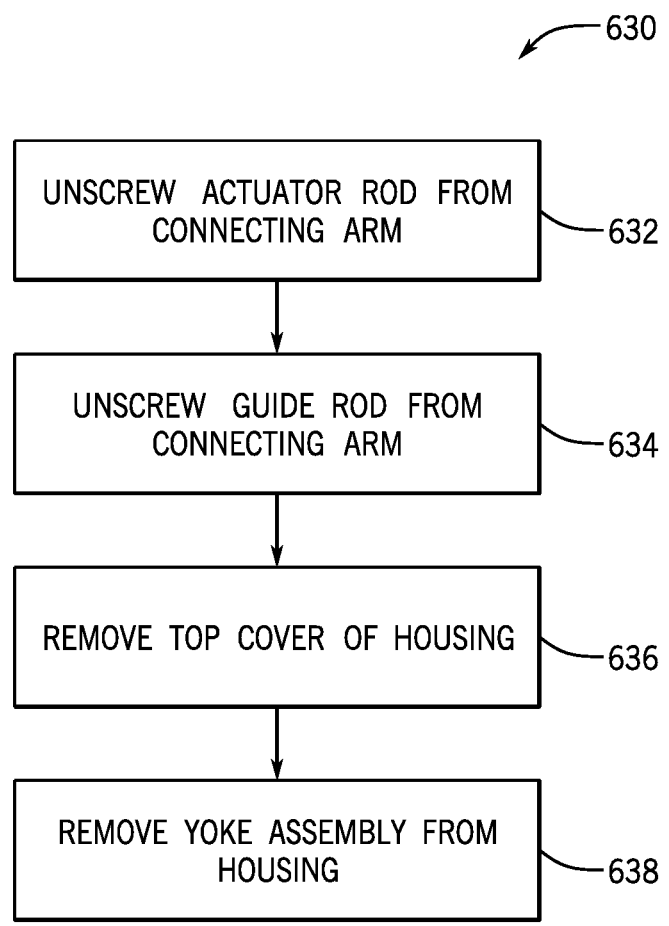
FIG. 32 is a flowchart illustrating a method of removing a yoke of a Scotch yoke actuator for a valve.

FIG. 32 illustrates a method 630 for removing a yoke of a Scotch yoke actuator for a valve. By way of example, the method 630 will be described below with reference to the actuator 100, although other actuators can be used. Operation 632 of method 630 includes unscrewing the piston rod 120 from the connecting arm 156 while the connecting arm 156 is disposed within the base 140 of the housing assembly 104. Operation 634 of method 630 includes unscrewing the guide rod 154 from the connecting arm 156. As noted above, a guide rod can be disconnected from a connecting arm before or after an actuator rod. Further, removal of a guide rod in this and other methods disclosed herein may not be necessary in some cases (e.g., when no guide rod is used).

Operation 636 of method 630 includes removing the cover 142 of the housing assembly 104 to provide access to the top opening of the base 140, without detaching the cylinder assembly 102. Operation 638 of method 630 includes removing the yoke assembly 106 from the base 140 of the housing assembly 104. In this regard, for example, rather than requiring removal of an actuator assembly in order to replace a yoke, embodiments of the invention can beneficially allow for a yoke to be replaced with actuator assemblies remaining in place.

Other variations are also possible, consistent with the general principles discussed above and the structures and functionality presented relative to specific, illustrated embodiments. In some embodiments, aspects of some of the arrangements discussed or illustrated above can be interchanged with or added to aspects of others consistent with the general scope of this disclosure. For example, any of the yoke assemblies or components thereof that are disclosed herein may be used in an actuator similar to either of the actuators 100, 300 described above. Likewise, different configurations of known rod assemblies, linear actuators, limit stops, and so on can be substituted for corresponding components of, or otherwise added to, any of the configurations discussed above. Additionally, the methods 610 and 630 can be readily applied to a variety of other actuators, with or without corresponding variation to the described operations, including the actuator 300.

Thus, embodiments of the invention can provide an improved actuator for a valve, as compared to conventional approaches. For example, in some embodiments, an actuator may include a yoke assembly that produces torque curves similar to conventional actuators while providing a compact and robust housing. Additionally, embodiments disclosed herein may provide streamlined methods of assembly, disassembly, and reversal of valve actuators.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An actuator for a valve assembly, the actuator comprising:
   a yoke with at least one passage, the yoke being configured to rotate about a yoke axis to actuate the valve assembly, and the at least one passage extending transverse to the yoke axis;
   a first rod assembly configured to move in a first direction transverse to the at least one passage and the yoke axis, the first rod assembly including a piston rod, a guide rod, and a first connecting arm, the first connecting arm being coupled to the guide rod and the piston rod; and
   a first slide member seated within the at least one passage and pivotally secured to the first connecting arm of the first rod assembly, the first slide member being configured to slide within the at least one passage as the first rod assembly moves in the first direction, to transmit torque to the yoke for actuation of the valve assembly.

2. The actuator of claim 1, wherein the at least one passage includes at least one bore; and
   wherein the first slide member includes a first free end that is pivotally secured to the first rod assembly at the first connecting arm and a second free end that is telescopically nested within the at least one bore.

3. The actuator of claim 1, wherein the piston rod of the first rod assembly is part of a cylinder assembly that is configured to controllably move the first rod assembly in the first direction;
   wherein the piston rod is slidably supported with a sliding bushing.

4. The actuator of claim 3, wherein the piston rod is a stepped rod with a shoulder that contacts the sliding bushing after a predetermined movement in the first direction to slide the sliding bushing in the first direction.

5. The actuator of claim 1, further comprising:
   a housing that at least partly encloses the yoke, the first rod assembly, and the first slide member; and
   wherein the first rod assembly extends across the housing transverse to the yoke axis and extends outside of the housing on opposing sides of the housing to be slidably supported on the opposing sides of the housing for movement in the first direction.

6. The actuator of claim 5, wherein the housing includes a housing shell that includes an opening on each of the opposing sides, a first end cap, and a second end cap; and
   wherein the first and second end caps are secured to the housing shell at a corresponding one of the openings and slidably support the first rod assembly.

7. The actuator of claim 6, wherein the first end cap supports a linear actuator relative to the housing for movement of the first rod assembly in the first direction; and
   wherein the first end cap is configured to be secured to the housing in either of two orientations to provide either of two opposite rotational modes for the yoke.

8. The actuator of claim 1, wherein:
   the piston rod extends through a first opposing side of a housing that houses the yoke;
   the first connecting arm is threadedly secured to the piston rod and pinned to the first slide member; and
   the guide rod is threadedly secured to the first connecting arm opposite the piston rod and extends through a second opposing side of the housing.

9. The actuator of claim 1, further comprising:
   a limit stop bushing in threaded engagement with a housing of the actuator;
   wherein the first rod assembly extends through the limit stop bushing; and
   wherein the limit stop bushing is threadedly adjustable relative to the housing to adjust a limit stop location for the first rod assembly relative to movement of the first rod assembly in the first direction.

10. The actuator of claim 9, wherein a first side of the limit stop bushing is configured to contact a first part of the first rod assembly to provide a first limit stop and a second side of the limit stop bushing is configured to contact a second part of the first rod assembly to provide a second limit stop.

11. The actuator of claim 1, further comprising:
    a second rod assembly configured to move in a second direction transverse to the at least one passage and the yoke axis, opposite the yoke from the first rod assembly; and
    a second slide member seated within the at least one passage and pivotally secured to the second rod assembly, the second slide member being configured to slide telescopically within the at least one passage as the second rod assembly moves in the second direction, to transmit torque to the yoke to actuate the valve assembly.

12. The actuator of claim 11, wherein the first slide member is configured to slide within the at least one passage with a first range of motion along a first axis during actuation of the valve assembly; and
    wherein the second slide member is configured to slide within the at least one passage with a second range of motion along a second axis during actuation of the valve assembly; and
    wherein the first range of motion overlaps with the second range of motion.

13. The actuator of claim 12, wherein the first slide member is configured to telescopically slide within the second slide member to move along the first range of motion.

14. The actuator of claim 12, wherein the first axis is offset from the second axis along or transverse to the yoke axis.

15. The actuator of claim 1, wherein at least one slot extends along the at least one passage transverse to the yoke axis; and
wherein a pin protrudes from the first slide member to slidably engage the slot during sliding movement of the first slide member within the at least one passage.

16. The actuator of claim 1, wherein the yoke comprises:
a valve-engagement portion configured to engage a valve member of the valve assembly for rotation of the valve member by the actuator; and
a rod-securing portion, separately formed from the valve-engagement portion;
wherein the rod-securing portion is secured by bearing members to the valve-engagement portion to define the at least one passage between the rod-securing and valve-engagement portions, with the bearing members extending between the rod-securing and valve-engagement portions to define first and second opposing sides of the at least one passage; and
wherein the at least one passage is sized to receive, via at least one of a third or a fourth opposing side of the at least one passage, the first slide member so that sliding movement of the first rod assembly is converted to torque on the yoke via sliding movement of the first slide member along the bearing members within the at least one passage.

17. The actuator of claim 1, wherein the first slide member is pivotally secured to the first rod assembly at a first end and extends from the first end toward the yoke axis, to a second end of the first slide member that is opposite the first end and is in sliding engagement with the at least one passage;
wherein movement of the first rod assembly in the first direction causes the first slide member to pivot relative to the first rod assembly at the first end and slide within the at least one passage at the second end and thereby transmit the torque on the yoke.

18. A method of reversing a rotational mode of a Scotch yoke actuator for a valve, the method comprising:
disconnecting a connecting arm from a first slide member, the connecting arm being disposed within a housing of the actuator and, before being disconnected, being pivotally secured to the first slide member to support the first slide member for telescopic movement of the first slide member within a corresponding bore of a yoke of the actuator;
removing, from proximate a first entry into the housing on a first side of the housing, the connecting arm and a linear actuator for applying torque to the yoke via an actuator rod and the connecting arm;
without reversing an orientation of the housing, inserting the connecting arm into a second entry into the housing on the first side of the housing, and securing the linear actuator to the housing proximate the second entry; and
connecting the connecting arm to a second slide member within the housing for telescopic movement of the second slide member within the yoke.

19. The method of claim 18, further for removing a yoke of the Scotch yoke actuator for the valve, the method further comprising:
unscrewing an actuator rod of the linear actuator from engagement with the connecting arm;
removing a top cover of the housing to provide a top opening in the housing, without detaching the linear actuator from the housing or removing a side wall of the housing that supports the actuator and the actuator rod during operation; and
removing the yoke through the top opening.

20. An actuator for a valve assembly, the actuator comprising:
a yoke configured to rotate about a yoke axis to actuate the valve assembly;
a rod assembly configured to move in a first direction transverse to the yoke axis, the rod assembly including a connecting arm; and
a slide member pivotally secured to the connecting arm at a first end and extending from the first end toward the yoke axis, to a second end of the slide member that is telescopically engaged with the yoke;
the slide member being thereby configured to exhibit a changing angle relative to the rod assembly and a corresponding changing telescopic depth of engagement with the yoke as the rod assembly moves in the first direction, to provide torque on the yoke.

* * * * *